US010427103B2

(12) United States Patent
Noguchi et al.

(10) Patent No.: US 10,427,103 B2
(45) Date of Patent: Oct. 1, 2019

(54) SEPARATION MEMBRANE MODULE AND REPAIRING METHOD THEREOF

(71) Applicant: Mitsubishi Chemical Corporation, Chiyoda-ku (JP)

(72) Inventors: Naoki Noguchi, Fukuoka (JP); Hirotsugi Tominaga, Tokyo (JP); Fumiya Shimizu, Mie (JP)

(73) Assignee: Mitsubishi Chemical Corporation, Chiyoda-ku (JP)

(*) Notice: Subject to any disclaimer, the term of this patent is extended or adjusted under 35 U.S.C. 154(b) by 50 days.

(21) Appl. No.: 15/685,381

(22) Filed: Aug. 24, 2017

(65) Prior Publication Data
US 2017/0348643 A1 Dec. 7, 2017

Related U.S. Application Data

(63) Continuation of application No. PCT/JP2016/055535, filed on Feb. 24, 2016.

(30) Foreign Application Priority Data

Feb. 25, 2015 (JP) .................... 2015-035383
Feb. 25, 2015 (JP) .................... 2015-035384

(Continued)

(51) Int. Cl.
*B01D 69/04* (2006.01)
*B01D 65/08* (2006.01)
(Continued)

(52) U.S. Cl.
CPC ............ *B01D 69/04* (2013.01); *B01D 63/061* (2013.01); *B01D 65/08* (2013.01); *B01D 63/06* (2013.01);
(Continued)

(58) Field of Classification Search
CPC ....... B01D 69/04; B01D 65/08; B01D 63/061
See application file for complete search history.

(56) References Cited

U.S. PATENT DOCUMENTS 3,240,342 A   3/1966 Callahan, Jr. et al.
4,555,337 A   11/1985 Gargas
(Continued)

FOREIGN PATENT DOCUMENTS

CN       2598621 Y      1/2004
DE   10 2006 020 662 A1  11/2007
(Continued)

OTHER PUBLICATIONS

Office Action dated Oct. 9, 2018 in corresponding Japanese Patent Application No. 2015-035383 (with English Translation), 6 pages.
(Continued)

*Primary Examiner* — Chester T Barry
(74) *Attorney, Agent, or Firm* — Oblon, McClelland, Maier & Neustadt, L.L.P.

(57) ABSTRACT

An object of the present invention is to provide a separation membrane module in which an end member is prevented from coming out even at the occurrence of a reverse pressure or the like. The invention relates to a separation membrane module which is equipped with a cylinder-shaped housing and a tubular separation membrane and which takes out a fluid which has permeated the tubular separation membrane. An end pipe is connected to one end portion of the tubular separation membrane; the end pipe is supported by a support plate which is disposed so as to traverse the housing; and an end plug is connected to the other end portion of the tubular separation membrane. The separation membrane module is further equipped with a coming-out preventive member.

10 Claims, 24 Drawing Sheets

(30) Foreign Application Priority Data

| Feb. 25, 2015 | (JP) | 2015-035385 |
| Feb. 25, 2015 | (JP) | 2015-035386 |
| Dec. 22, 2015 | (JP) | 2015-250116 |

(51) Int. Cl.
  *B01D 63/06* (2006.01)
  *B01D 53/22* (2006.01)

(52) U.S. Cl.
  CPC .. *B01D 2053/224* (2013.01); *B01D 2313/025* (2013.01); *B01D 2313/04* (2013.01); *B01D 2313/06* (2013.01); *B01D 2313/20* (2013.01); *B01D 2313/21* (2013.01); *B01D 2315/04* (2013.01)

(56) References Cited

U.S. PATENT DOCUMENTS

| 2014/0366493 A1 | 12/2014 | Takahashi |
| 2015/0190755 A1 | 7/2015 | Miyahara et al. |

FOREIGN PATENT DOCUMENTS

| EP | 0 446 422 A1 | 9/1991 |
| JP | 51-32487 | 3/1976 |
| JP | 55-111513 U | 8/1980 |
| JP | 61-407 A | 1/1986 |
| JP | 9-75614 A | 3/1997 |
| JP | 9-294923 | 11/1997 |
| JP | 10-235163 | 9/1998 |
| JP | 2000-312811 | 11/2000 |
| JP | 2001-259378 A | 9/2001 |
| JP | 2003-144859 | 5/2003 |
| JP | 3557712 B2 | 8/2004 |
| JP | 2005-313156 A | 11/2005 |
| JP | 2009-39654 | 2/2009 |
| JP | 2009-66503 | 4/2009 |
| JP | 2011-152507 | 8/2011 |
| JP | 2012-91071 A | 5/2012 |
| JP | 2013-39546 | 2/2013 |
| JP | 2013-212509 A | 10/2013 |
| JP | 2014-205097 A | 10/2014 |
| WO | WO 2006/037234 A1 | 4/2006 |
| WO | WO 2008/082065 A1 | 7/2008 |
| WO | WO 2010/104684 A1 | 9/2010 |
| WO | WO 2014/050702 A1 | 4/2014 |

OTHER PUBLICATIONS

Office Action dated Oct. 9, 2018 in corresponding Japanese Patent Application No. 2015-035386 (with English Translation), 4 pages.
Office Action dated Oct. 16, 2018 in corresponding Japanese Patent Application No. 2015-035384 (with English Translation), 4 pages.
International Search Report dated Apr. 19, 2016 in PCT/JP2016/055535, filed on Feb. 24, 2016 (with English Translation).
Written Opinion dated Apr. 19, 2016 in PCT/JP2016/055535, filed on Feb. 24, 2016.
Partial Supplementary European Search Report dated Jan. 30, 2018 in Patent Application No. 16755590.3. 13 pages.
Extended European Search Report dated Feb. 28, 2019 in Patent Application No. 16755590.3, 16 pages.

SEPARATION MEMBRANE MODULE AND REPAIRING METHOD THEREOF

TECHNICAL FIELD

The present invention relates to a separation membrane module used for separating part of the components of a fluid such as a solution or a mixed gas, as well as to a repairing method thereof.

BACKGROUND ART

Separation membrane modules are known as devices for separating components of a solution or a mixed gas. Tubular separation membranes used in separation membrane modules have a tubular porous ceramic support body and a porous separation membrane which is formed on the outer circumferential surface of the support body and made of zeolite or the like. Among methods for separating a particular component from a fluid such as a solution or a mixed gas, a method that a particular component is separated through vaporization by bringing a fluid (solution) into contact with one surface (outer surface) of a separation membrane element with reducing the pressure on the other side (inside); a method that a particular component is separated by vaporizing a solution and bringing a resulting gas into contact with a separation membrane with reducing the pressure on the non-contact side; and a method that a particular component is separated by bringing a mixed gas in a pressurized state into contact with a separation membrane are known (Patent documents 1-3).

Patent document 2 discloses a structure that a small-diameter insertion portion of a tubular member is inserted in one end portion of a tubular zeolite separation membrane and sealing is established between the zeolite separation membrane and the tubular member by O-rings made of a fluorine rubber. A processing target fluid is supplied to outside the zeolite separation membrane, and part of its components permeate the zeolite separation membrane and flow into its inside. These components are thus separated from the other components and taken out.

Patent document 2 also discloses a structure that the zeolite separation membrane and the tubular member butt against each other and the outer circumference of the butting portion is covered with a heat-shrinkable film.

Patent document 2 further discloses a structure that the tubular member is fixed to a fixing member by screwing and one end portion of the zeolite membrane is fitted with an insertion portion of the tubular member.

BACKGROUND ART DOCUMENTS

Patent Documents

Patent document 1: JP-A-2013-39546
Patent document 2: JP-A-2011-152507
Patent document 3: JP-A-2009-39654

SUMMARY OF THE INVENTION

Problems to be Solved by the Invention

In the structures of Patent document 2 that the zeolite separation membrane and the end member are connected to each other by fitting the end member into an end portion of the zeolite separation membrane or they butt against each other with covering with the heat-shrinkable film, a reverse pressure phenomenon that the pressure inside the zeolite separation membrane becomes higher than that outside it may occur for a certain reason. Furthermore, when a force acts on the end member in such a direction as to move it away from the zeolite separation membrane, the end member may come out of the zeolite separation membrane.

A first object of the present invention is to provide a separation membrane module in which an end member is prevented from coming out even at the occurrence of such a reverse pressure or the like.

In the separation membrane modules disclosed in Patent documents 1 and 3, a phenomenon may occur that the zeolite separation membrane is vibrated by a flow of a fluid, as a result of which an abnormal sound is generated or the sealing portions are rendered prone to deteriorate.

A second object of the invention is therefore to provide a separation membrane module in which vibration of a tubular separation membrane is prevented.

Furthermore, in the method that the tubular member is fixed to the fixing member by screwing, in the case where the number of zeolite separation membranes is large, thread formation work and screwing work take much time and labor, as a result of which a manufacturing period of a separation membrane module becomes long and its manufacturing cost is made high.

A third object of the invention is therefore to provide a separation membrane module in which an end pipe which is connected to one end portion of a tubular separation membrane can be attached to a support plate easily and the support plate can be manufactured easily.

Still further, in a separation membrane module in which tubular separation membranes are installed in a housing, if part of the tubular separation membranes e.g., one tubular separation membrane are damaged and a processing target fluid thereby leaks into the secondary side (permeation side), it is a conventional measure wherein supplying the processing target fluid to the separation membrane module is necessary to be stopped to replace the damaged tubular separation membranes. As a result, the operation of the separation membrane module is stopped for a long time.

A fourth object of the invention is therefore to provide a separation membrane module and its repairing method that make it possible to deal with damaging of part of the tubular separation membranes and restart operation in a short time.

Means for Solving the Problems

The summary of the present invention is described below.
[1] A separation membrane module comprising:
    a cylinder-shaped housing; and
    a tubular separation membrane disposed in the housing, wherein:
    a processing target fluid flows through the housing from its one end side to the other end side and a fluid which has permeated the tubular separation membrane flows through the tubular separation membrane and is taken out;
    an end pipe is connected to one end portion of the tubular separation membrane;
    the end pipe is supported by a support plate which is disposed so as to traverse the housing;
    an end plug is connected to the other end portion of the tubular separation membrane;
    and the separation membrane module further comprises a coming-out preventive member which prevents the end plug from coming out of the tubular separation membrane.
[2] The separation membrane module according to the above [1], wherein the separation membrane module further comprises, as the coming-out preventive member, a pressing plate which is opposed to the end plug.

[3] The separation membrane module according to the above [1] or [2], wherein the separation membrane module further comprises, as the coming-out preventive member, a spring which presses the end plug toward the tubular separation membrane.

[4] The separation membrane module according to the above [1], wherein the separation membrane module further comprises, as the coming-out preventive member, a spring which pulls the end plug and the end pipe toward itself.

[5] A separation membrane module comprising:
a cylinder-shaped housing; and
a tubular separation membrane disposed in the housing, wherein:
a processing target fluid flows through the housing from its one end side to the other end side and a fluid which has permeated the tubular separation membrane flows through the tubular separation membrane and is taken out;
an end pipe is connected to one end portion of the tubular separation membrane;
the end pipe is supported by a support plate which is disposed so as to traverse the housing;
an end plug is connected to the other end portion of the tubular separation membrane; and
the end plug has an urging member.

[6] The separation membrane module according to the above [5], wherein the urging member is at least one of a pressing plate which is opposed to the end plug and a spring which presses the end plug toward the tubular separation membrane or a spring which pulls the end plug and the end pipe toward itself.

[7] The separation membrane module according to any one of the above [2], [3] and [6], wherein the spring which presses the end plug toward the tubular separation membrane is sandwiched between the pressing plate and the end plug.

[8] The separation membrane module according to any one of the above [1] to [7], wherein the end plug has a rod which projects from a top end surface of the end plug.

[9] A separation membrane module comprising:
a cylinder-shaped housing;
a tubular separation membrane disposed in the housing; and
a vibration absorbing member for the tubular separation membrane, wherein:
a processing target fluid flows through the housing from its one end side to the other end side and a fluid which has permeated the tubular separation membrane flows through the tubular separation membrane and is taken out.

[10] The separation membrane module according to the above [9], wherein the vibration absorbing member is a sheet-like member.

[11] The separation membrane module according to the above [9] or [10], wherein:
an end pipe is connected to one end portion of the tubular separation membrane;
the end pipe is supported by a support plate which is disposed so as to traverse the housing;
an end plug is connected to the other end portion of the tubular separation membrane; and
the vibration absorbing member is disposed so as to be in contact with the end plug.

[12] The separation membrane module according to the above [11], further comprising a pressing plate which is opposed to the end plug, wherein:

the end plug or a rod which projects from the end plug is inserted through an opening of the pressing plate; and
the vibration absorbing member is disposed on the opposite side of the pressing plate to the tubular separation membrane, and the end plug or the rod is in contact with the vibration absorbing member.

[13] The separation membrane module according to any one of the above [1] to [12], wherein:
an end pipe is connected to one end portion of the tubular separation membrane;
the end pipe projects from one plate surface of a support plate which is disposed so as to traverse the housing;
the end pipe is inserted in an insertion hole which is formed in the one plate surface of the support plate; and
sealing is established between the end pipe and the insertion hole by an O-ring.

[14] The separation membrane module according to the above [13], wherein the O-ring is inserted in a groove which is formed in at least one of an outer circumferential surface and an end surface of the end pipe; and
the end pipe and the support plate are connected to each other by insertion, in the insertion hole, of the end pipe to which the O-ring is attached.

[15] The separation membrane module according to any one of the above [1] to [14], wherein:
the housing is provided with an opening and closing member which can be opened and closed; and
a closing member can be attached to a permeation fluid output portion of the tubular separation membrane via the opening and closing member.

[16] The separation membrane module according to any one of the above [1] to [15], wherein the fluid is a gas mixture.

[17] A method for repairing the separation membrane module according to the above [15] or [16], comprising the steps of:
opening the opening and closing member of the housing when the separation membrane module has been damaged; and
attaching the closing member to the permeation fluid output portion of the damaged tubular separation membrane.

[18] A gas mixture separation method comprising the steps of:
introducing a gas mixture into the separation membrane module according to any one of the above [1] to [16]; and
separating a highly permeable gas from the mixture by causing permeation of the former.

[19] A high-density gas manufacturing method comprising the steps of:
introducing a gas mixture into the separation membrane module according to any one of the above [1] to [16]; and
producing a high-density gas by separating a highly permeable gas.

Effect of the Invention

In the separation membrane module according to the first mode of the invention, even if a reverse pressure occurs in the tubular separation membrane, the end plug can be prevented from coming out of the tubular separation membrane. Where the coming-out preventing means is formed by the pressing plate and the spring or using the spring which pulls the end plug and the end pipe to itself, a high degree of sealing is established between the tubular separation membrane and the end plug and between the tubular separation membrane and the end pipe.

In the separation membrane module according to the second mode of the invention, since the vibration absorbing member for absorbing vibration of the tubular separation membrane is provided, vibration of the tubular separation membrane is prevented (or suppressed), whereby generation of an abnormal sound is prevented and the sealing portions, the support body, and the separation membrane module are increased in durability.

In the separation membrane module according to the third mode of the invention, the end pipe is connected to the support plate by inserting the end pipe into the insertion hole formed in the support plate. This insertion work is very easy. Even a large number of insertion holes can be formed easily. As such, the invention facilitates manufacture of the support plate.

In the separation membrane module and its repairing method according to the fourth mode of the invention, when part of the tubular separation membranes are damaged, the opening and closing member of the housing is opened and the permeation fluid output portion of each damaged tubular separation membrane is closed by the closing member. This measure prevents a phenomenon that a processing target fluid which leaks into the secondary side of each damaged tubular separation membrane is mixed into a permeation fluid of the other, normal tubular separation membranes.

MODES FOR CARRYING OUT THE INVENTION

Figure 1:
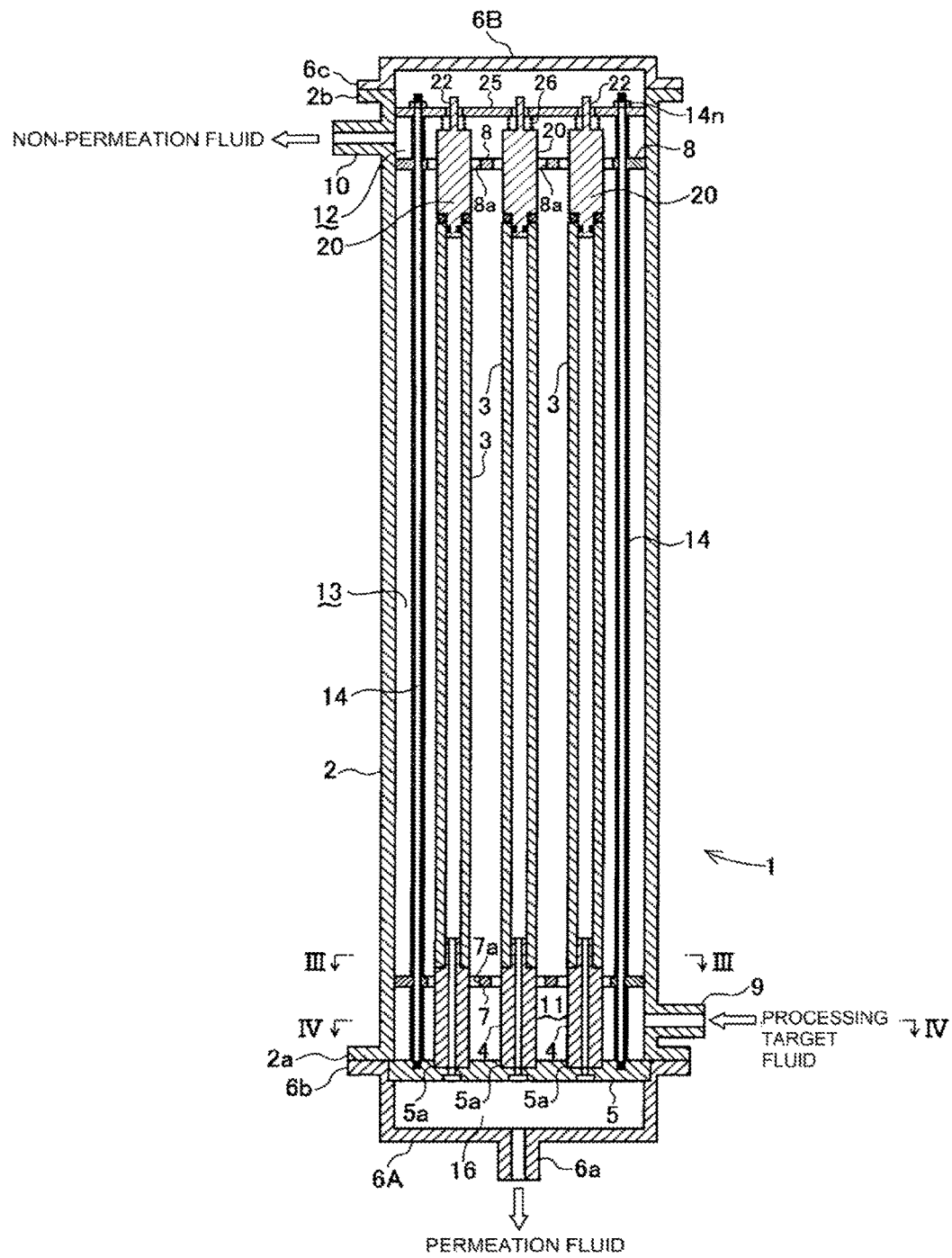
FIG. 1 is a sectional view, taken by a plane including a housing axial line, of a separation membrane module according to a first embodiment.

A separation membrane module according to a first embodiment of the invention has a cylinder-shaped housing and a tubular separation membrane disposed in the housing in which a processing target fluid flows through the housing from its one end side to the other end side and a fluid which has permeated the tubular separation membrane flows through the tubular separation membrane and is taken out. The separation membrane module is characterized in:

that an end pipe is connected to one end portion of the tubular separation membrane;

that the end pipe is supported by a support plate which is disposed so as to traverse the housing;

that an end plug is connected to the other end portion of the tubular separation membrane; and that the separation membrane module comprises a coming-out preventive member which prevents the end plug from coming out of the tubular separation membrane.

It is preferable that the separation membrane module further comprise, as the coming-out preventive member, at least one of a pressing plate which is opposed to the end plug and a spring which presses the end plug toward the tubular separation membrane or a spring which pulls the end plug and the end pipe toward itself.

Another separation membrane module according to the first embodiment of the invention has a cylinder-shaped housing and a tubular separation membrane disposed in the housing in which a processing target fluid flows through the housing from its one end side to the other end side and a fluid which has permeated the tubular separation membrane flows through the tubular separation membrane and is taken out. The separation membrane module is characterized in:

that an end pipe is connected to one end portion of the tubular separation membrane;

that the end pipe is supported by a support plate which is disposed so as to traverse the housing;

that an end plug is connected to the other end portion of the tubular separation membrane; and that the end plug has an urging member.

There are no particular limitations on the urging member except that it should be a member which urges the end plug so that it does not come out of the tubular separation membrane. Examples of the urging member are a pressing plate and a spring. More specific examples are at least one of a pressing plate which is opposed to the end plug and a spring which presses the end plug toward the tubular separation membrane, and a spring which pulls the end plug and the end pipe to itself. The urging member is an example of the above-mentioned coming-out preventive member.

In the above mode, it is preferable that the spring that presses the end plug toward the tubular separation membrane be sandwiched between the pressing plate and the end plug. It is also preferable that the end plug have a rod which projects from a top end surface of the end plug.

The separation membrane module according to the first embodiment of the invention will be described below with reference to FIGS. 1, 2, 7-10, and 15. However, the scope of the invention is not limited to this.

This separation membrane module 1 is equipped with a cylindrical housing 2 which is disposed with its cylinder axis direction coincident with the top-bottom direction, tubular separation membranes 3 disposed parallel with the axial line of the housing 2, a support plate 5 disposed at the bottom of the housing 2, a bottom cover 6A and a top cover 6B which are attached to the bottom end and the top end of the housing 2, respectively, a first baffle (rectification plate) 7 and a second baffle (rectification plate) 8 which are disposed at a bottom position and a top position, respectively, in the housing 2 parallel with the support plate 5, a pressing plate 25, etc. The first baffle 7 is located over the support plate 5.

In this embodiment, flanges 2a, 2b, 6b, and 6c project outward from the bottom end and the top end of the housing 2 and the edges of the outer circumferential portions of the bottom cover 6A and the top cover 6B, respectively, and are fixed together by bolts (not shown). A circumferential edge portion of the support plate 5 is held between the flanges 2a and 6b via a gasket (not shown).

Figure 7:
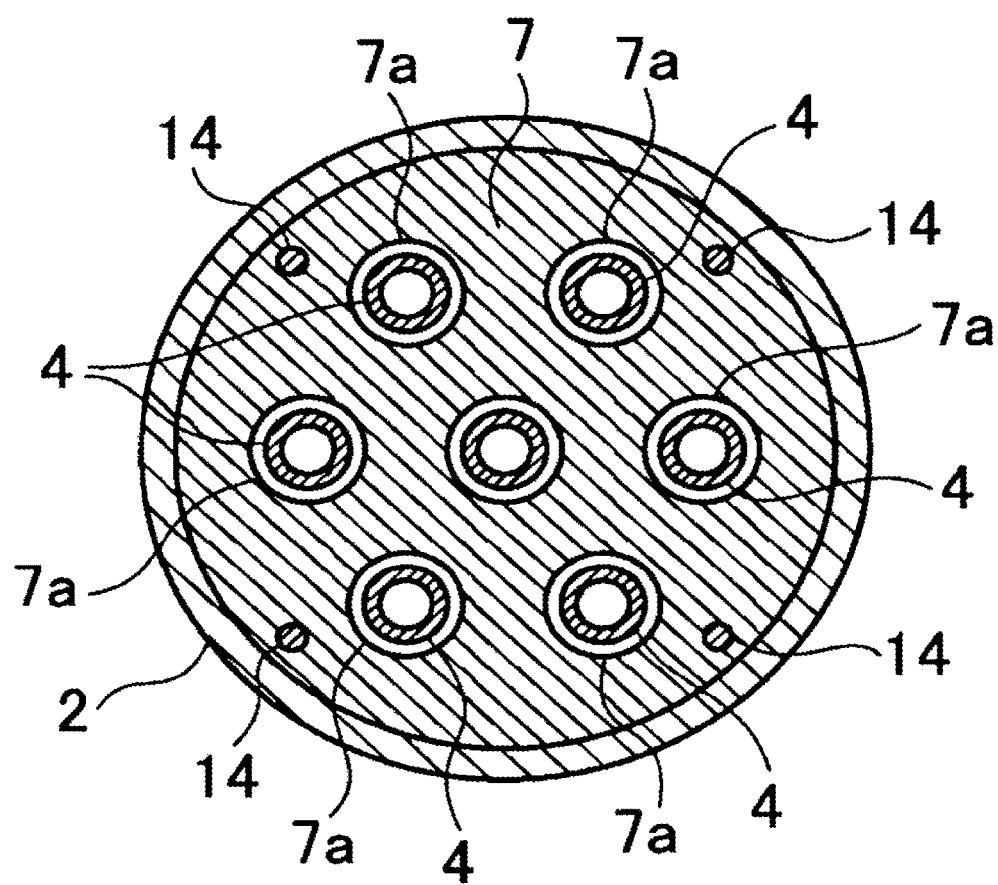
FIG. 7 is a sectional view taken along line in FIG. 1 or 3 or line II-II in FIG. 5 or 6.
Figure 8:
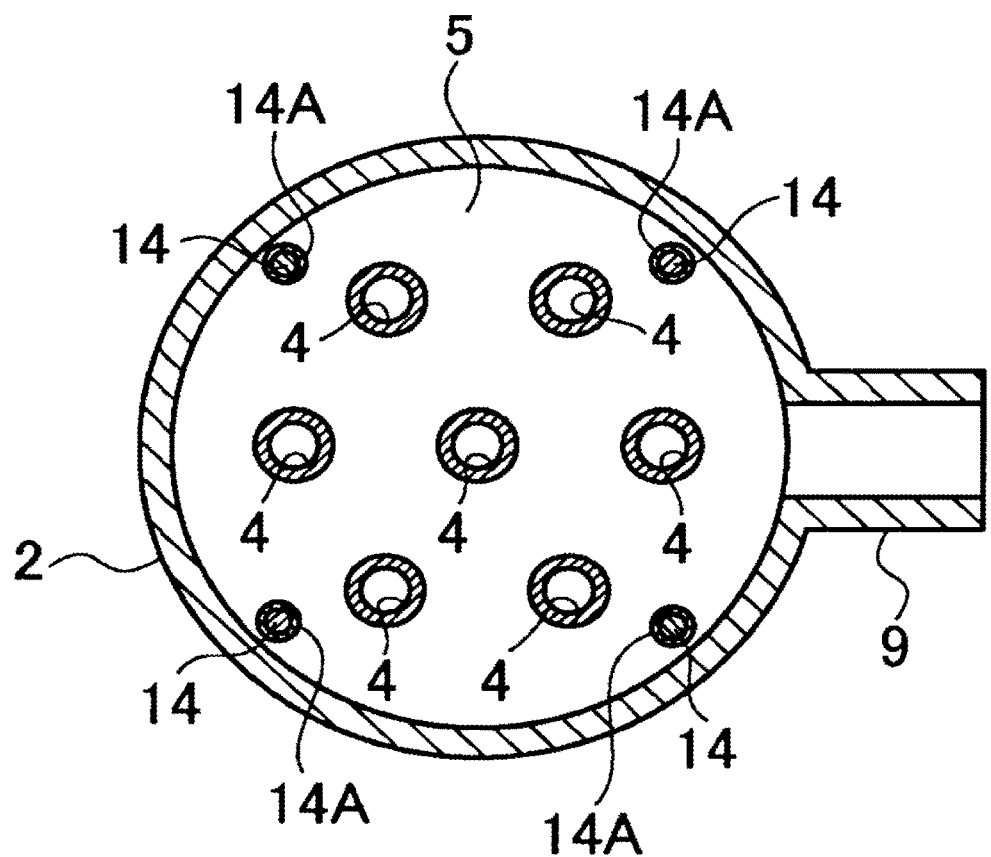
FIG. 8 is a sectional view taken along line IV-IV in FIG. 1 or 3 or line in FIG. 5 or 6.
Figure 15:
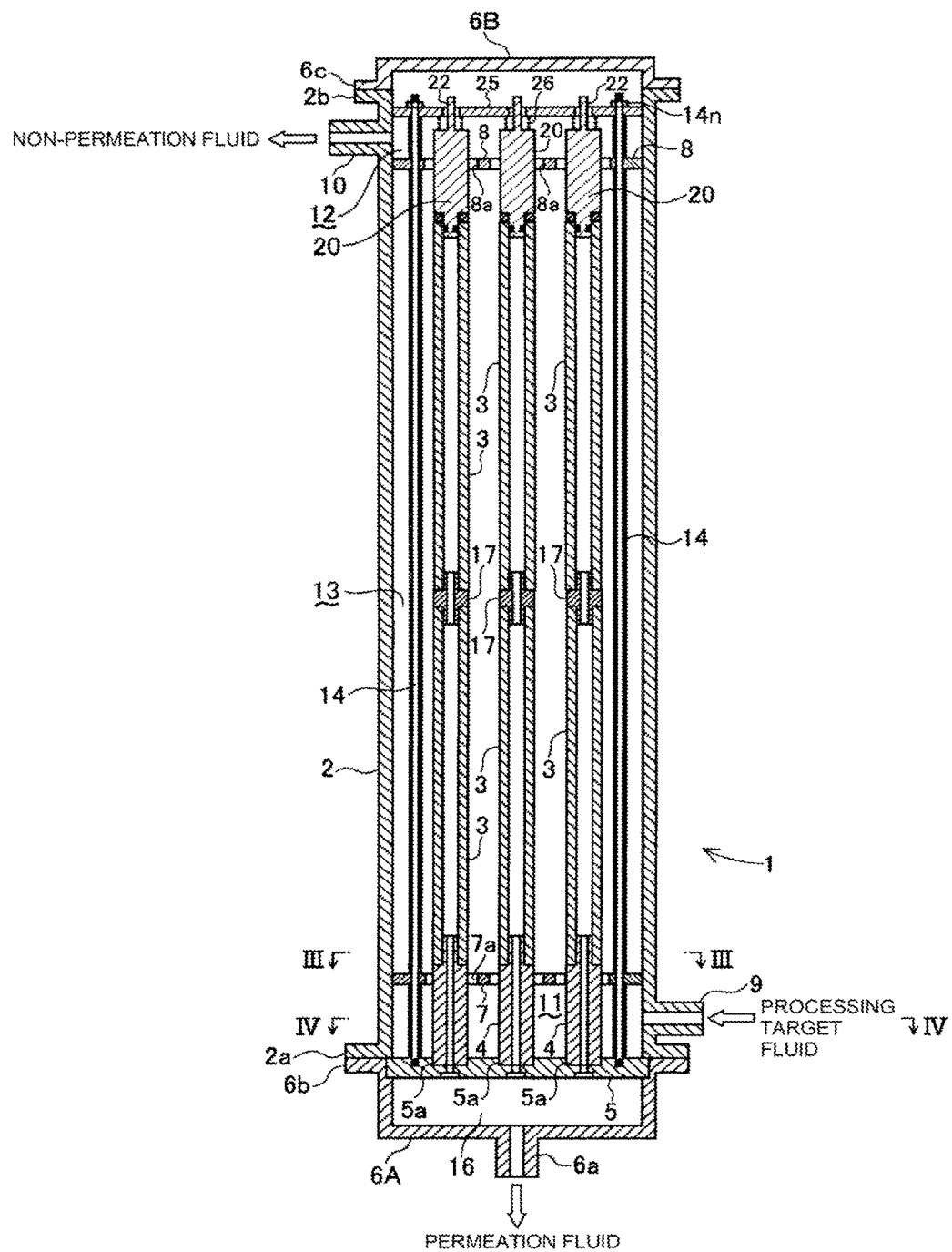
FIG. 15 is a sectional view, taken by a plane including the housing axial line, of the separation membrane module according to the first embodiment.

In this embodiment, end pipes 4 are connected to the bottom ends of the tubular separation membranes 3. End plugs 20 are connected to the top ends of the tubular separation membranes 3. As shown in FIG. 15, each tubular separation membrane 3 may be replaced by a tubular separation membrane connection body which is formed by connecting two tubular separation membranes 3 by a joint pipe 17. Although, for example, only seven tubular separation membranes are shown in FIGS. 7 and 8, in actuality only one tubular separation membrane 3 may be provided. A further alternative is a multitubular separation membrane module which is equipped with a number of (e.g., 2 to 3,000; preferably 50 to 1,500) tubular separation membranes.

The outer circumferential surface of the housing 2 is formed with an inlet 9 and an outlet 10 of a processing target fluid at a bottom position and a top position, respectively. The inlet 9 is disposed so as to enable access to a room 11 which is formed between the support plate 5 and the first baffle 7. The outlet 10 is disposed so as to enable access to a room 12 which is formed over the second baffle 8. A main room 13 for membrane separation is formed between the baffles 7 and 8.

Plural rods 14 project upward from the bottom support plate 5, and the baffles 7 and 8 and the pressing plate 25 are supported by the rods 14. Bottom end portions of the rods 14 are formed with male screws which are threadedly engaged with female screw holes of the support plate 5, respectively. The baffles 7 and 8 and the pressing plate 25 are supported respectively by sheath pipes 14A, 14B, and 14C (see FIGS. 2 and 9) which are fitted with the rods 14, so as to be placed at prescribed heights. The sheath pipes 14A are disposed between the support plate 5 and the baffle 7. The sheath pipes 14B are disposed between the baffles 7 and 8. The sheath pipes 14C are disposed between the baffle 8 and the pressing plate 25. The baffle 8 is placed on the top end surfaces of the sheath pipes 14B. The pressing plate 25 is located over the baffle 8, placed on the top end surfaces of the sheath pipes 14C, and fixed to the top ends of the rods 14 by nuts 14n which are threadedly engaged with top end portions of the rods 14, respectively.

In this embodiment, sealing members such as O-rings, V-packings, or C-rings may be sandwiched between the inner circumferential surface of the housing 2 and the outer circumferential surfaces of the baffles 7 and 8.

Although in this embodiment the number of baffles is two, three or more baffles may be provided.

The baffles 7 and 8 are formed with circular insertion through-holes 7a and 8a for insertion of the tubular separation membranes 3, and connection bodies each of which is formed by connecting a tubular separation membrane 3, an end pipe 4, and an end plug 20 are inserted through the insertion through-holes 7a and 8a. The diameters of the insertion through-holes 7a and 8a are larger than the diameters (outer diameters) of the tubular separation membranes 3, the end pipes 4, and the end plugs 20, and hence gaps are formed between the inner circumferential surfaces of the insertion through-holes 7a and 8a and the outer circumferential surfaces of the end pipes 4 and the end plugs 20 over the entire circumferences.

The top surface of the support plate 5 is formed with insertion holes 5a in which bottom portions of the end pipes 4 which are connected to the tubular separation membranes 3 are inserted. The insertion holes 5a are cylindrical and extend from the top surface of the support plate 5 to a halfway position in its thickness direction. The bottoms of the insertion holes 5a communicate with the space below the support plate 5 via small holes 5b and large holes 5c, respectively. Sealing between the end pipes 4 and the insertion holes 5a is established by O-rings.

A pipe hole 4a of each end pipe 4 communicates with, via the small hole 5b and the large hole 5c, an outflow room 16 which is formed by the bottom cover 6A and the support plate 5. The bottom cover 6A is provided with an outlet 6a of a separated permeation fluid.

Figure 10:
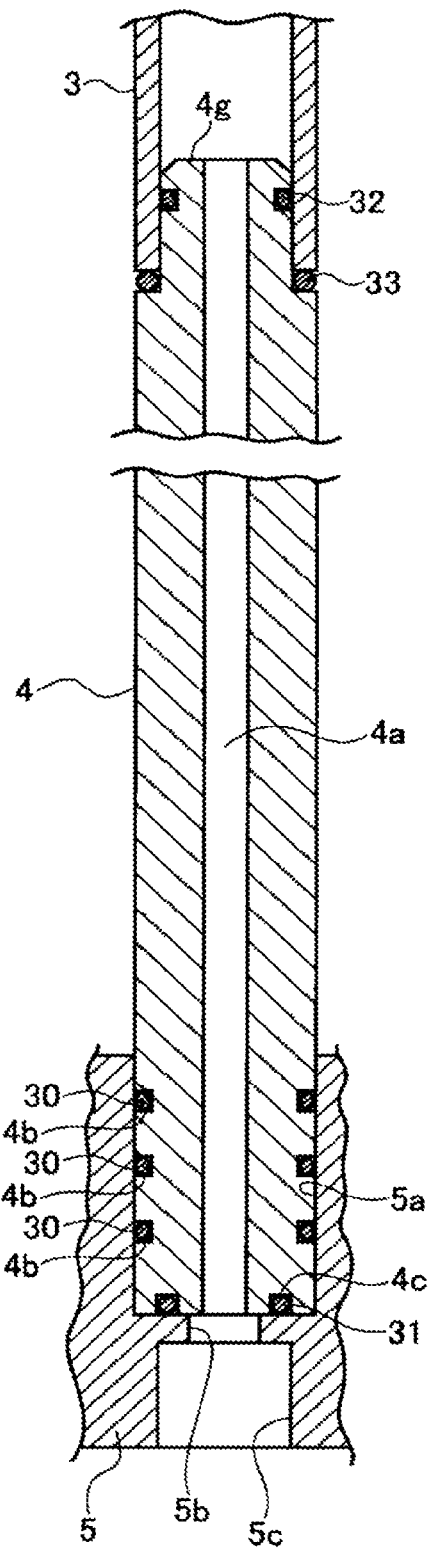
FIG. 10 is an enlarged view of part of FIG. 9.

As shown in FIG. 10, the outer circumferential surface of a portion, close to its bottom end, of each end pipe 4 is formed with circumferential grooves 4b in which O-rings 30 made of a fluorine rubber, a fluorine resin, or the like are inserted. Although in this embodiment the plural grooves 4b are formed, only one groove may be formed.

Sealing between the end pipes 4 and the insertion holes 5a is established by O-rings. More specifically, the bottom end surface of each end pipe 4 is formed with a circumferential groove 4c which is concentric with the pipe hole 4a and in which an O-ring 31 is inserted. Sealing is established between the outer surface of each end pipe 4 and the insertion hole 5a because the O-rings 30 are in close contact with the inner circumferential surface of the insertion hole 5a and the O-ring 31 is in close contact with the bottom surface of the insertion hole 5a. Only one of the set of O-rings 30 in contact with the outer circumferential surface of each end pipe 4 and the O-ring 31 in contact with the bottom end surface of the insertion hole 5a may be provided. That is, it is preferable that each end pipe 4 be connected to the support plate 5 in such a manner that an O-ring(s) is inserted in a groove(s) which is formed in at least one of the outer circumferential surface and the end surface of the end pipe and the end pipe which is provided with the O-ring(s) is inserted into the insertion hole.

Figure 9:
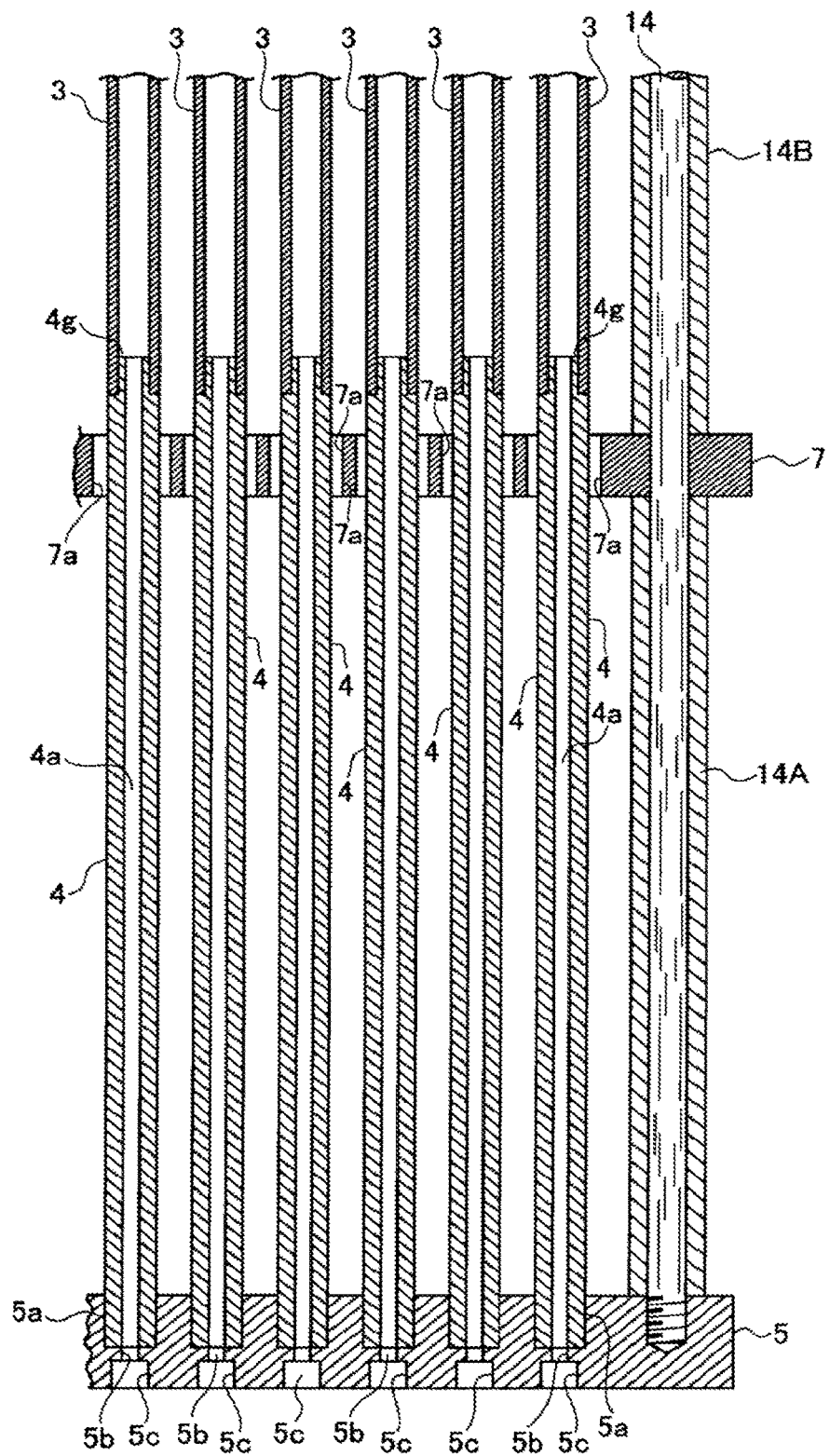
FIG. 9 is an enlarged sectional view of an end pipe and a support plate.

As shown in FIGS. 9 and 10, a top end portion of each end pipe 4 is shaped into a small-diameter portion 4g which is inserted in a bottom portion of the tubular separation membrane 3. Sealing between the end pipe 4 and the tubular separation membrane 3 is established by O-rings. An O-ring 32 is inserted in a circumferential groove which is formed in the outer circumferential surface of the small-diameter portion 4g. An O-ring 33 is sandwiched between the bottom end surface of the tubular separation membrane 3 and the step surface of the end pipe 4. Sealing between the end pipe 4 and the tubular separation membranes 3 may be established without using such O-rings; that is, using a heat-shrinkable tube or using both of such O-rings and a heat-shrinkable tube.

Figure 2:
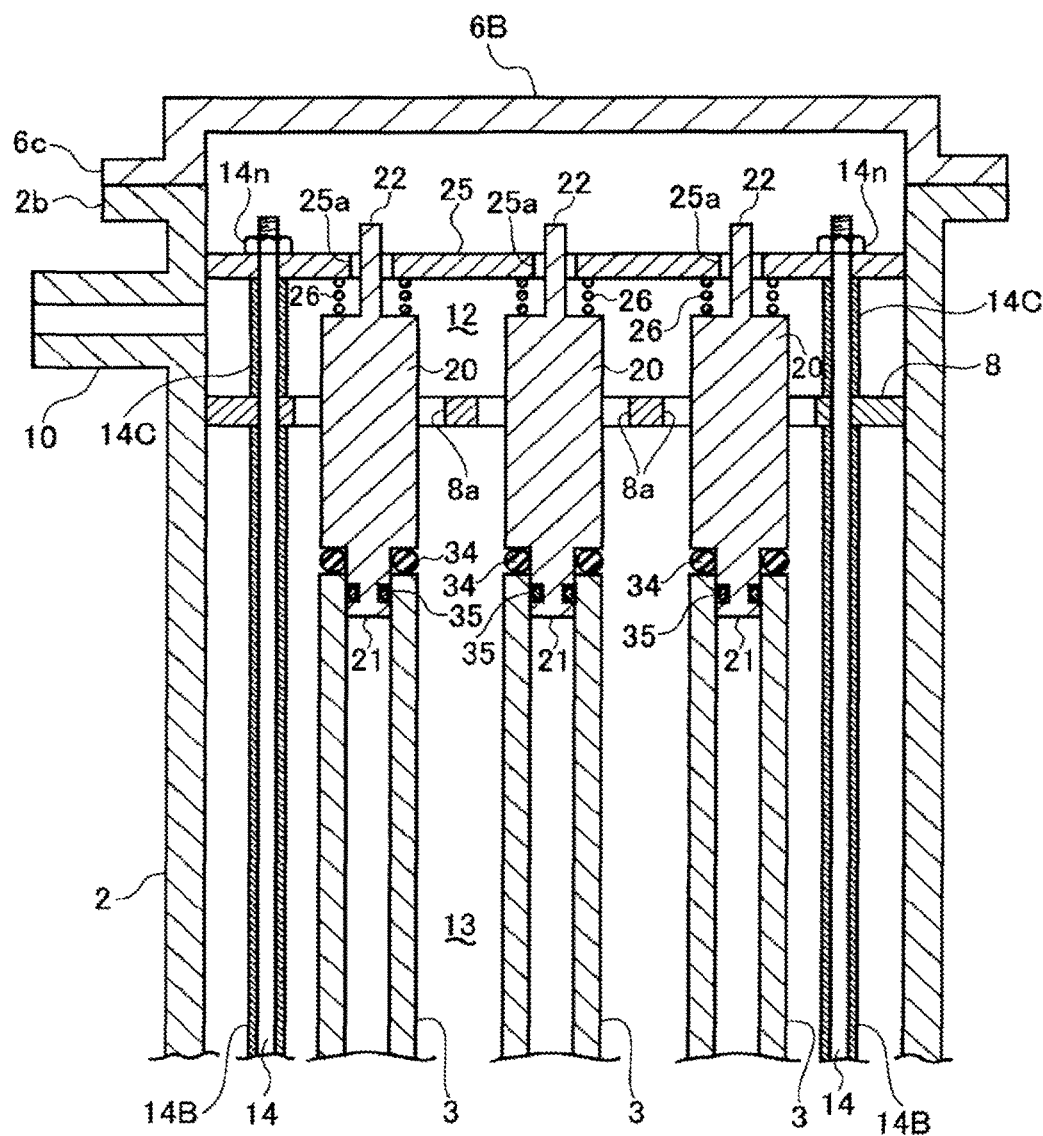
FIG. 2 is an enlarged view of a top part of FIG. 1.

As shown in FIGS. 1 and 2, the end plug 20 is connected to a top end portion of each (upper) tubular separation membrane 3. The end plug 20, which is cylindrical or has a shape obtained by cutting out portions of a cylinder, seals the tubular separation membrane 3 at its top. A bottom end portion of the end plug 20 is formed with a small-diameter portion 21 which is inserted in the tubular separation membrane 3. Sealing between the end plug 20 and the tubular separation membrane 3 is established by O-rings 34 and 35. The sealing structure of the end plug 20 and the tubular separation membrane 3 is the same as that of the small-diameter portion 4g of the end pipe 4 and the tubular separation membrane 3. Sealing between the end plug 20 and the tubular separation membranes 3 may be established without using O-rings; that is, using a heat-shrinkable tube or using both of the O-rings and a heat-shrinkable tube.

It is preferable that each end plug have a rod which projects from its top end surface. More specifically, a rod 22 projects upward from the center of the top end surface of the end plug 20. The pressing plate 25 which is located over the end plug 20 is formed with an opening 25a in which the rod 22 is inserted. That is, it is preferable that the pressing plate 25 is opposed to the end plug 20. The rod 22 is smaller in diameter than the opening 25a, and hence a gap is formed between the rod 22 and the inner circumferential surface of the opening 25a. With the diameter of the rod 22 represented by x, the diameter of the opening 25a should preferably be longer than or equal to x+0.02 mm and even preferably be longer than or equal to x+0.1 mm. And the diameter of the opening 25a should preferably be shorter than or equal to x+0.5 mm, much preferably be shorter than or equal to x+0.4 mm, and far preferably be shorter than or equal to x+0.2 mm. Where the gap is within this range, the rod 22 can move smoothly and play is unlikely to occur to lower the degree of vibration of the tubular separation membrane 3.

It is preferable that the separation membrane module is equipped with springs for pushing the end plugs 20 toward the tubular separation membranes. It is preferable that a compression coil spring 26 (hereafter may be referred to simply as a "spring 26") is sandwiched between the top end surface of each end plug 20 and the bottom surface of the pressing plate 25 so as to surround the rod 22. The end plug 20 is urged downward by the spring 26. With this measure, the end plug 20 is prevented from coming out even if the internal pressure of the tubular separation membrane 3 is increased due to a certain reason and a force acts on the end plug 20 in such a direction as to cause it to come out of the tubular separation membrane 3. Likewise, the upper tubular separation membrane 3 is prevented from coming out of the joint pipe 17 and the joint pipe 17 is prevented from coming out of the lower tubular separation membrane 3.

When each tubular separation membrane 3 expands or contracts thermally, the spring 26 contracts or expands accordingly.

Where as shown in FIG. 15 plural (e.g., two) tubular separation membranes 3 are connected to each other by joint pipes 17, the joint pipe 17 has a through-hole which penetrates through it in its axial direction. Both end portions (top and bottom end portions) of the joint pipe 17 are small-diameter portions which are inserted in the respective tubular separation membranes 3. The outer circumferential surface of each small-diameter portion is formed with a circumferential groove in which an O-ring (not shown) is inserted. Sealing between the joint pipe 17 and each tubular separation membrane 3 may be established without using an O-ring; that is, using a heat-shrinkable tube or using both of the O-ring and a heat-shrinkable tube.

The portion, between the small-diameter portions as the two end portions of the joint tube 17, of the joint tube 17 is a large-diameter portion and step surfaces are formed between the large-diameter portion and the respective small-diameter portions. O-rings (not shown) are also sandwiched between the step surfaces and the end surfaces of the tubular separation membranes 3.

Although not shown in any drawings, in case of connection by a joint pipe 17, it is preferable that a baffle be disposed at the position of the joint pipes 17.

To assemble this separation membrane module 1, for example, the end pipes 4, the tubular separation membranes 3 and the end plugs 20 are inserted into the respective insertion holes 5a of the support plate 5 in order so that they project upward from the support plate 5. Air-tight or liquid-tight connection between the support plate 5 and the end pipes 4 can be made easily by merely inserting the bottom end portions of the end pipes 4 into the insertion holes 5a. Since the insertion holes 5a are cylindrical, work of forming the insertion holes 5a of the support plate 5 can be done easily and hence the support plate 5 can be manufactured easily. This contributes to shortening of a manufacturing period of the separation membrane module and reduction of its manufacturing cost.

After causing the connection bodies of an end pipe 4, a tubular separation membrane 3, and an end plug 20 to project upward from the support plate 5, the pressing plate 25 is put on the end pipes 4 with the springs 26 sandwiched between them and the nuts 14n are screwed. Then the top cover 6B is attached.

In the thus-configured separation membrane module 1, a processing target fluid is introduced into the room 11 of the housing 2 through the inlet 9; flows into the main room 13 through the gaps between the inner circumferential surfaces of the insertion through-holes 7a of the baffle 7 and the outer circumferential surfaces of the end pipes 4; goes along the main room 13, and flows into the room 12 through the gaps between the insertion through-holes 8a of the baffle 8 and the end plugs 20. As the processing target fluid flows along the main room 13, part of its components permeate the tubular separation membrane 3 and are taken out through the outflow room 16 and the outlet 6a. The other part which does not permeate the tubular separation membranes 3 of the components of the fluid flows out of the separation membrane module 1 through the outlet 10.

In this embodiment, since each end plug 20 is attached to the top end portion of the tubular separation membrane 3 and urged downward by the spring 26, loads act on the tubular separation membrane 3, the end plug 20, and the end pipe 4 in such directions that they are pressed against each other. As a result, the degree of sealing between them is high and, as mentioned above, a phenomenon can be prevented that the end plug 20, the tubular separation membrane 3, or the joint pipe 17 comes out when the internal pressure of the tubular separation membrane 3 is increased.

A flow in the main room 13 and flows in the tubular separation membranes 3 may be in either the same direction or opposite directions, and the inlet 9 and the outlet 10 for a processing target fluid may be interchanged.

In this embodiment, membrane separation can be performed efficiently because a number of tubular separation membrane 3 are arranged parallel with each other and hence the total membrane area is large.

In this embodiment, the end pipe 4 and the end plug 20 which are connected to the two respective ends of each tubular separation membrane 3 are inserted through the insertion through-holes 7a and 8a of the baffles 7 and 8. Thus, even if the tubular separation membrane 3 is vibrated or swung and the end pipe 4 and the end plug 20 come into contact with the inner circumferential surfaces of the insertion through-holes 7a and 8a, a zeolite membrane is not damaged. As a result, a stable operation is enabled for a long time.

Although in the above embodiment sealing between each tubular separation membrane 3 and each of the end pipe 4 and the end plug 20 is established by the O-rings, sealing between them can be established by connecting them by a heat-shrinkable tube.

Although the above embodiment employs the springs 26, the springs 26 may be omitted in a case that the interval between the pressing plate 25 and the top end surfaces of the end plugs 20 is small. In this case, when the end plug 20 is moved upward due to increase of the internal pressure of a tubular separation membrane 3, the top end surface of the end plugs 20 hits the pressing plate 25 and is thereby prevented from coming out.

Although in the above embodiment the springs 26 push the end plugs 20, springs may be used that pull the end plugs 20 and the end pipes 4, respectively. This embodiment will be described with reference to FIG. 11.

Figure 11:
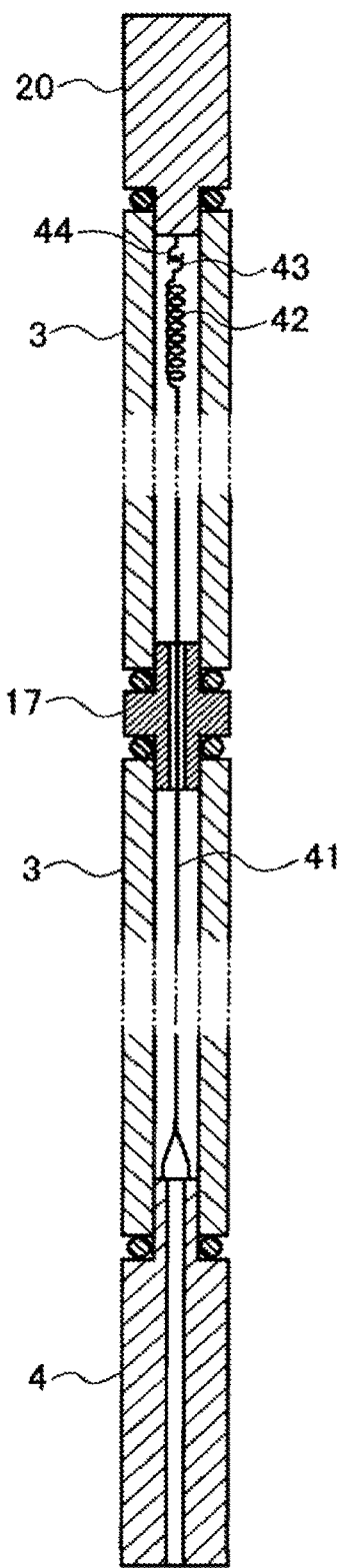
FIG. 11 is a sectional view of a tubular separation membrane connection body according to an embodiment relating to the first embodiment.

FIG. 11 is a sectional view of a connection body of tubular separation membranes 3, an end pipe 4, and an end plug 20 according to this embodiment. In this connection body, a wire 41 is disposed in the tubular separation membranes 3 and the bottom ends of the wire 41 are connected to the top end surface of the end pipe 4. The bottom end of a tension coil spring 42 is connected to the top end of the wire 41. A hook 43 is provided at the top end of the tension coil spring 42. A hook piece 44 is attached to the bottom end surface of the end plug 20, and the hook 43 is hooked on the hook piece 44. The end plug 20 and the end pipe 4 are pulled elastically by pulling forces of the tension coil spring 42, whereby the end plug 20, the tubular separation membranes 3, etc. are prevented from coming out.

Figure 24:
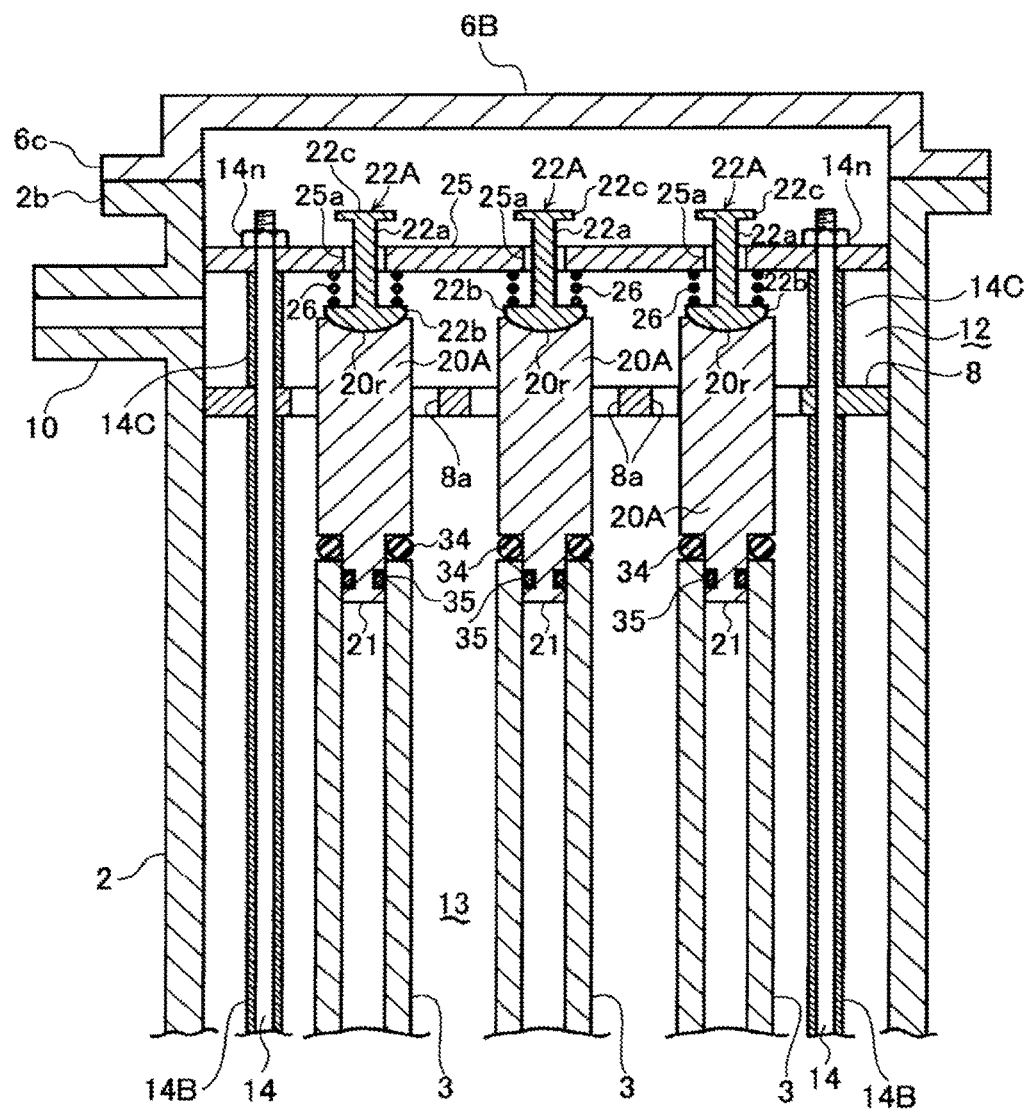
FIG. 24 is an enlarged sectional view, taken by a plane including a housing axial line, of a top part of a separation membrane module relating to the first embodiment.

Although in the above embodiment each set of an end plug 20 and a rod 22 is a unitized body, they may be separate bodies. This example is shown in FIG. 24 in which each rod 22A has a rod main body 22a which is inserted in the opening 25a, a disc-shaped portion 22b formed at the bottom end of the rod main body 22a, and a coming-off prevention portion 22c formed at the top end of the rod main body 22a. The diameter of the rod main body 22a is the same as each rod 22. The coming-off prevention portion 22c may be shaped like either a disc or a rod. The size of the coming-off prevention portion 22c (i.e., the diameter of the disc-shaped coming-off prevention portion 22c or the length of the rod-shaped coming-off prevention portion 22c) is larger than the diameter of the opening 25a, whereby the rod 22A is prevented from passing through the opening 25a and coming off.

In this embodiment, the bottom surface of the disc-shaped portion 22b is a curved surface that is curved so as to be convex downward. The top end surface of the end plug 20A is a convex surface 20r that is curved so as to be concave upward.

The compression coil spring 26 is sandwiched between the top surface of the disc-shaped portion 22b and the bottom surface of the pressing plate 25 so as to surround the rod main body 22a. The spring 26 urges the rod 22A downward and thereby presses its disc-shaped portion 22b against the convex surface 20r. Since the bottom surface of the disc-shaped portion 22b and the convex surface 20r are the above-described curved surfaces, the end plug 20A and the rod 22A come to extend in the vertical direction automatically when the rod 22A is pressed against the end plug 20A.

The other part of the configuration shown in FIG. 24 is the same as that shown in FIG. 2, and the same symbols in these drawings denote the same component or portion.

Example configurations of separation membrane systems using plural separation membrane modules 1 will be described with reference to FIGS. 12-14.

Figure 12:
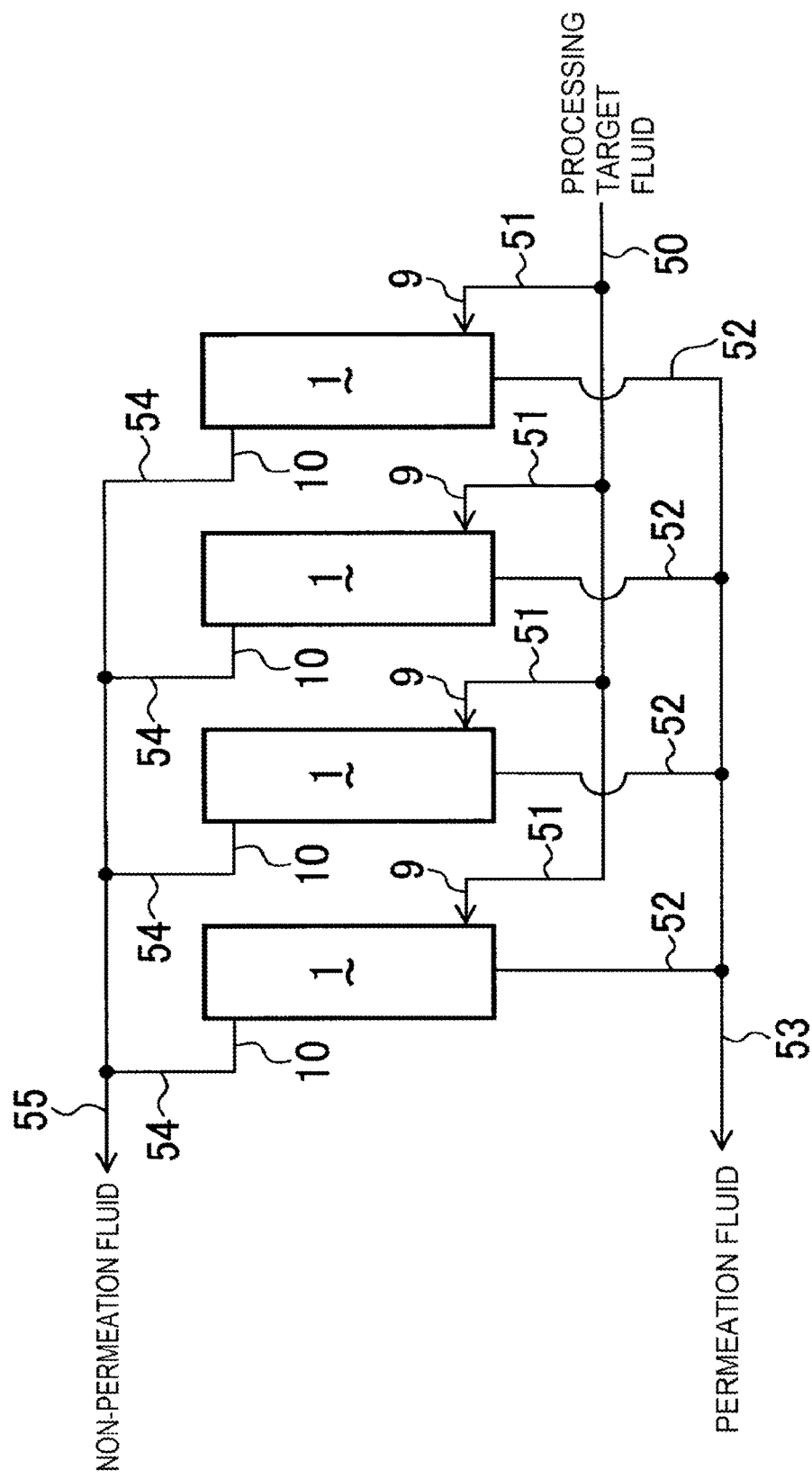
FIG. 12 is a flow diagram of a separation membrane system.

FIG. 12 is a flow diagram of a separation membrane system in which plural separation membrane modules 1 are arranged parallel with each other. Each separation membrane module 1 is installed in the posture shown in FIG. 1, i.e., the inlet 9 and the outlet 10 are located below and above, respectively. A processing target fluid is supplied to the inlets 9 of the respective separation membrane modules 1 via a supply main pipe 50 and plural branch pipes 51, subjected to membrane separation processing, and a permeation fluid is taken out via branch pipes 52 and a collecting pipe 53. A non-permeation fluid flows out via branch pipes 54 and a collecting pipe 55.

In this separation membrane system, if tubular separation membrane 3 of a part of the separation membrane modules 1 is damaged and a processing target fluid directly flows into this tubular separation membrane 3 through a damaged portion, the inner pressure of the damaged tubular separation membrane 3 of the separation membrane module 1 is increased and the inner pressures of the tubular separation membranes 3 of the other separation membrane modules 1 are also increased via the branch pipes 54 and the collecting pipe 55.

In this embodiment, even in the event of such a reverse pressure phenomenon, as described above, the end plugs 20 etc. of each separation membrane module 1 do not come out.

Figure 13:
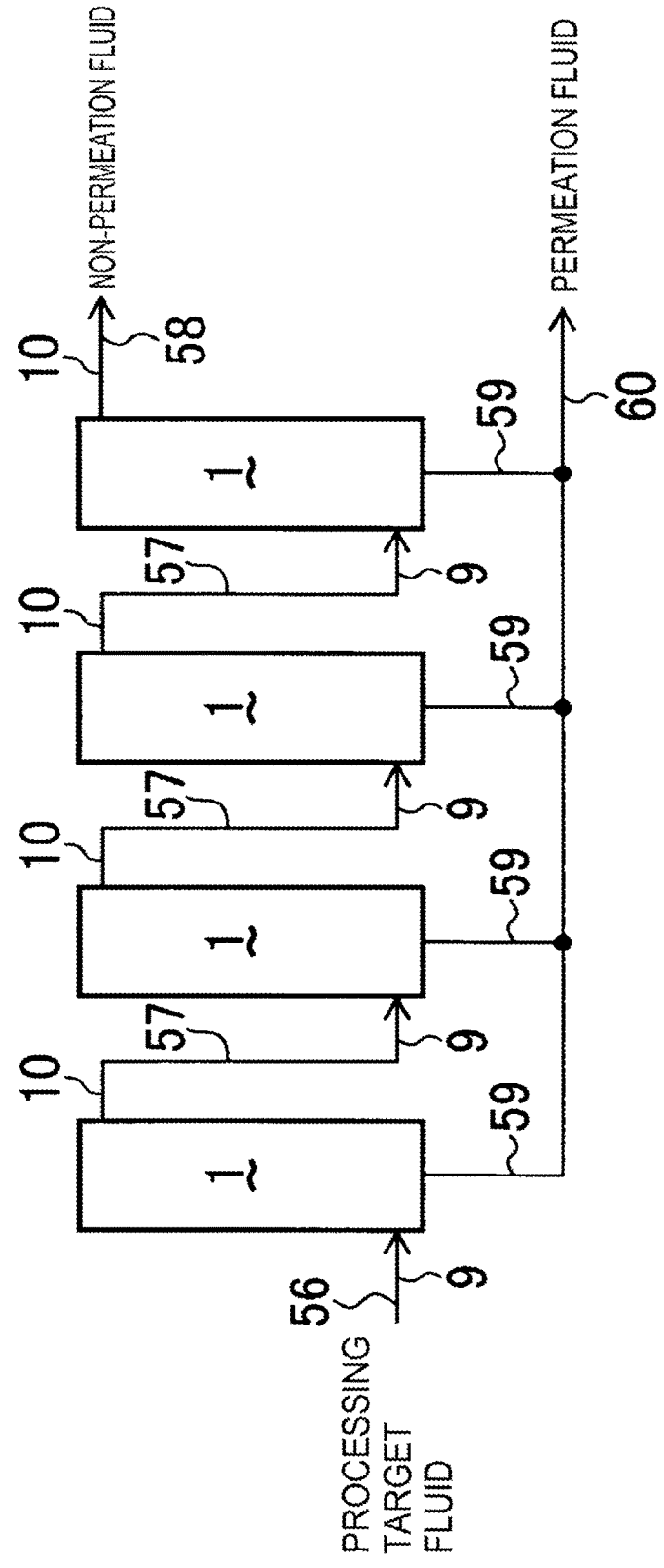
FIG. 13 is a flow diagram of a separation membrane system.

FIG. 13 is a flow diagram of a separation membrane system in which plural separation membrane modules 1 are connected to each other in series. Each separation membrane module 1 is installed in the posture shown in FIG. 1 i.e., the inlet 9 and the outlet 10 are located below and above, respectively. A processing target fluid is supplied to the inlet 9 of the most upstream separation membrane module 1 from a supply pipe 56, and a resulting non-permeation fluid is supplied to the inlet 9 of the next-stage separation membrane module 1 via the outlet 10 of the former separation membrane module 1 and a pipe 57. Likewise, a non-permeation fluid which is output from each separation membrane module 1 is supplied to the immediately downstream separation membrane module 1 and a non-permeation fluid which is output from the final-stage separation membrane module 1 flows out of a pipe 58. A permeation fluid which has permeated the tubular separation membranes 3 of each separation membrane module 1 is taken out via branch pipes 59 and a collecting pipe 60.

Figure 14:
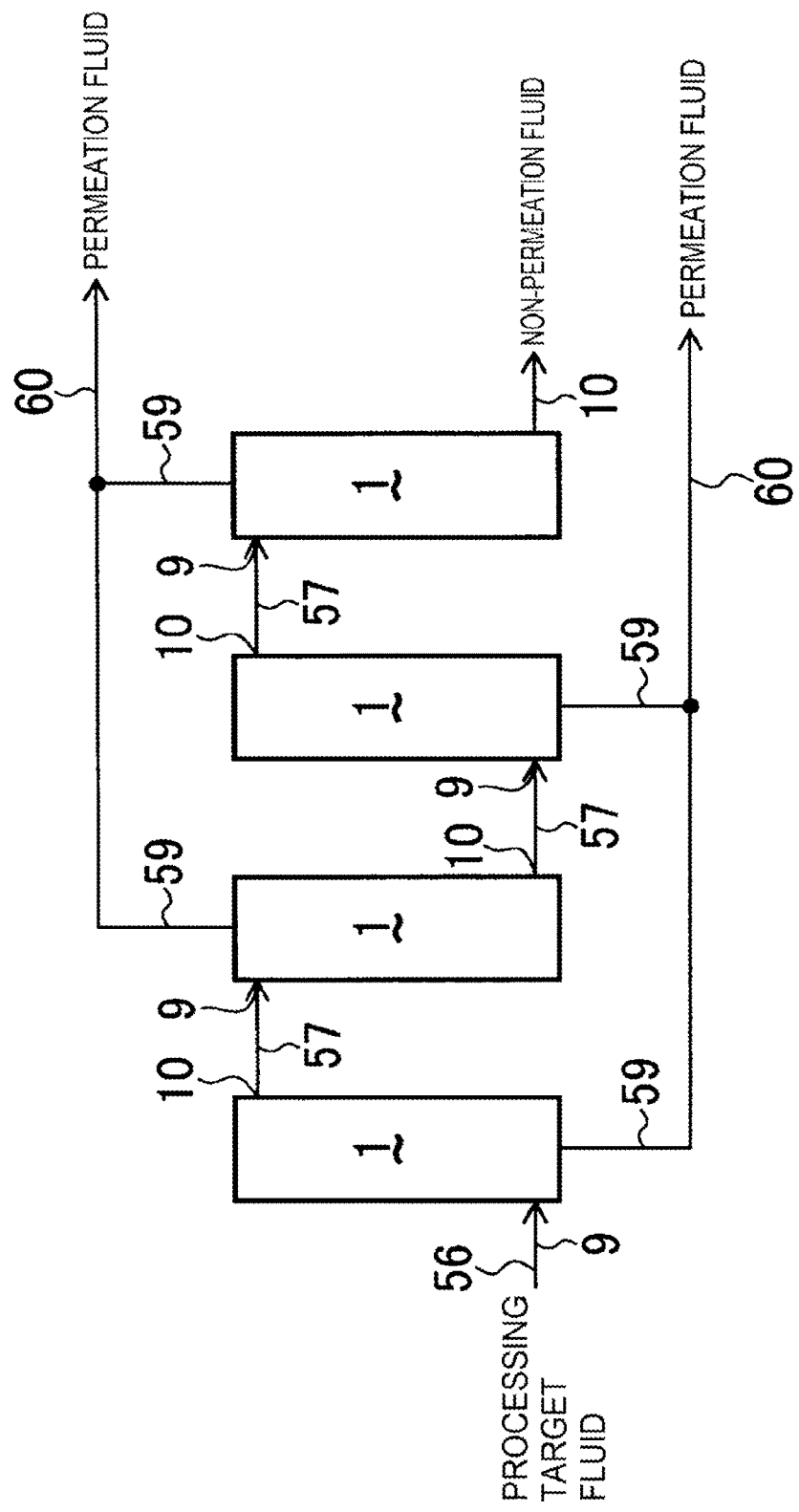
FIG. 14 is a flow diagram of a separation membrane system.

FIG. 14 shows a separation membrane system in which plural separation membrane modules 1 are connected to each other in series and in which odd-numbered separation membrane modules 1 are installed in the posture shown in FIG. 1 and the even-numbered separation membrane modules 1 are installed in the posture (inverted posture) reverse to the posture shown in FIG. 1. That is, in each even-numbered separation membrane module 1, the inlet 9 is located at the top of the separation membrane module 1 and the outlet 10 is located at its bottom. The other part of the configuration is the same as shown in FIG. 13, and the manners of flow of a processing target fluid, permeation fluids, and non-permeation fluids are the same as shown in FIG. 13. In the configuration of FIG. 14, the length of each pipe 57 can be shorter than in the configuration of FIG. 13. Since each separation membrane module 1 is equipped with the springs 26, the end plugs 20, the tubular separation membranes 3, and the joint pipes 17 are prevented from coming out even if the separation membrane module 1 is installed in the inverted posture.

In FIGS. 13 and 14, a processing target fluid is taken out via the collecting pipe 60, a modification is possible in which the collecting pipe 60 is omitted and the processing target fluid is taken out via each branch pipe 59.

As described above, in the separation membrane module 1 according to the invention, it is possible to input a processing target fluid through the outlet 10 and output a non-permeation fluid through the inlet 9. Thus, in the configuration of FIG. 13, the pipe 57 for guiding a non-permeation fluid from each odd-numbered separation membrane module 1 into the next-stage separation membrane module 1 (even-numbered separation membrane module 1) may be connected to the outlet 10 of the even-numbered separation membrane module 1.

A separation membrane module according to a second embodiment of the invention has a cylinder-shaped housing and a tubular separation membrane disposed in the housing in which a processing target fluid flows through the housing from its one end side to the other end side and a fluid which has permeated the tubular separation membrane flows through the tubular separation membrane and is taken out, characterized by comprising a vibration absorbing member for the tubular separation membrane.

In the above mode, it is preferable that the vibration absorbing member be a sheet-like member.

It is preferable that an end pipe be connected to one end portion of the tubular separation membrane, the end pipe be supported by a support plate that is disposed so as to traverse the housing, an end plug be connected to the other end portion of the tubular separation membrane; and the vibration absorbing member be disposed so as to be in contact with the end plug. It is even preferable that a pressing plate be provided so as to be opposed to the end plug; the end plug or a rod which projects from the end plug is inserted through an opening of the pressing plate, the vibration absorbing member be disposed on the opposite side of the pressing plate to the tubular separation membrane; and the end plug or the rod is in contact with the vibration absorbing member.

The separation membrane module according to the second embodiment of the invention will be described below with reference to FIGS. 3,4, 7-10, and 18. However, the scope of the invention is not limited to this.

This separation membrane module 1 is equipped with a cylindrical housing 2, plural tubular separation membranes 3 disposed parallel with the axial line of the housing 2, a support plate 5 disposed at the bottom of the housing 2, a bottom cover 6A and a top cover 6B which are attached to the bottom end and the top end of the housing 2, respectively, a first baffle (rectification plate) 7 and a second baffle (rectification plate) 8 which are disposed at a bottom position and a top position, respectively, in the housing 2 parallel with the support plate 5, a pressing plate 25, etc. The first baffle 7 is located over the support plate 5.

In this embodiment, flanges 2a, 2b, 6b, and 6c project outward from the bottom end and the top end of the housing 2 and the edges of the outer circumferential portions of the bottom cover 6A and the top cover 6B, respectively, and are fixed together by bolts (not shown). A circumferential edge portion of the support plate 5 is held between the flanges 2a and 6b via a gasket (not shown).

The separation membrane module 1 can also be used even if it is installed upside down in the cylinder axis direction, i.e., the bottom cover 6A is located above, or it is installed horizontally so that the direction connecting the bottom cover 6A and the top cover 6B is approximately horizontal. This also applies to the other embodiments.

Figure 18:
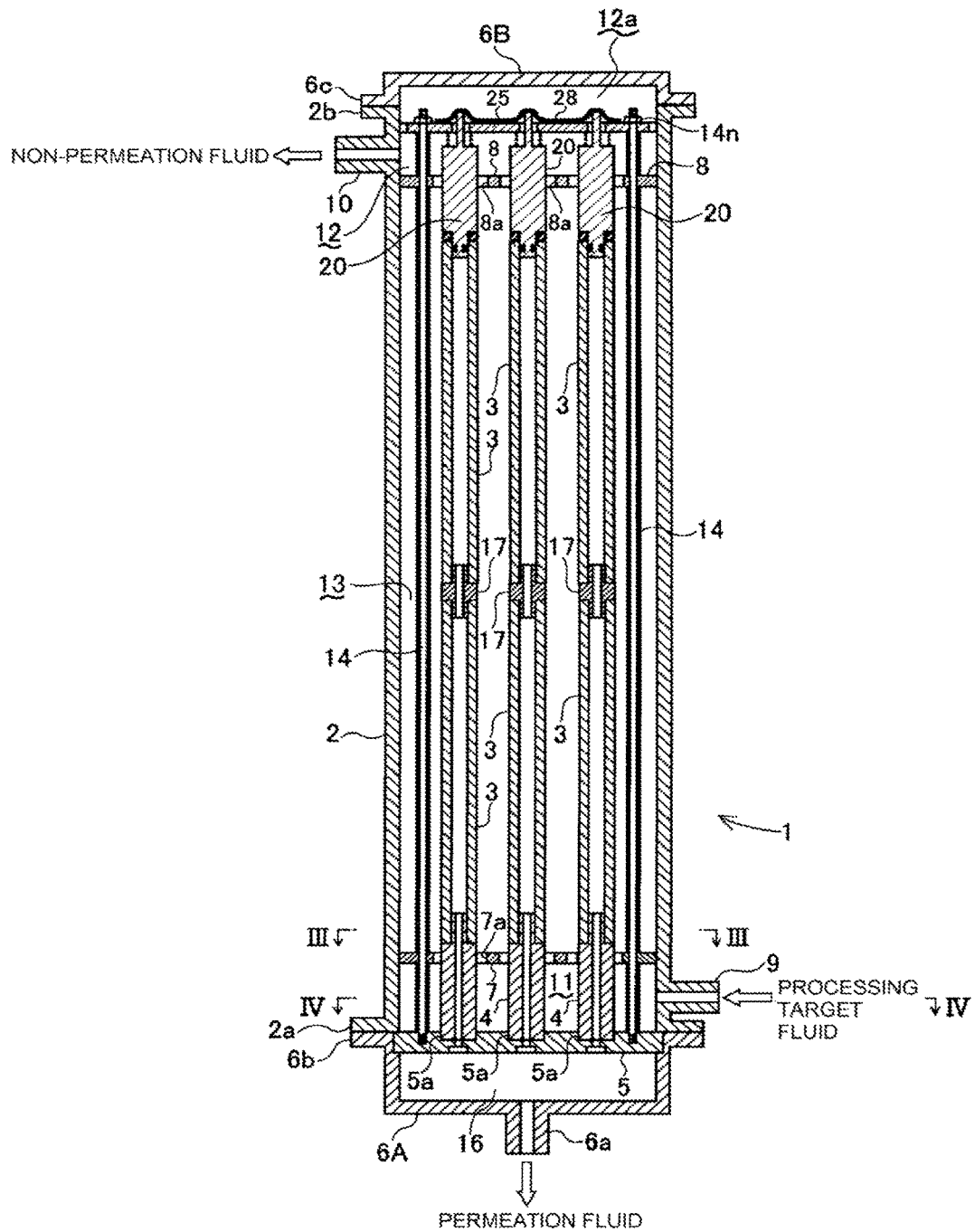
FIG. 18 is a sectional view, taken by a plane including the housing axial line, of the separation membrane module according to the second embodiment.
Figure 19:
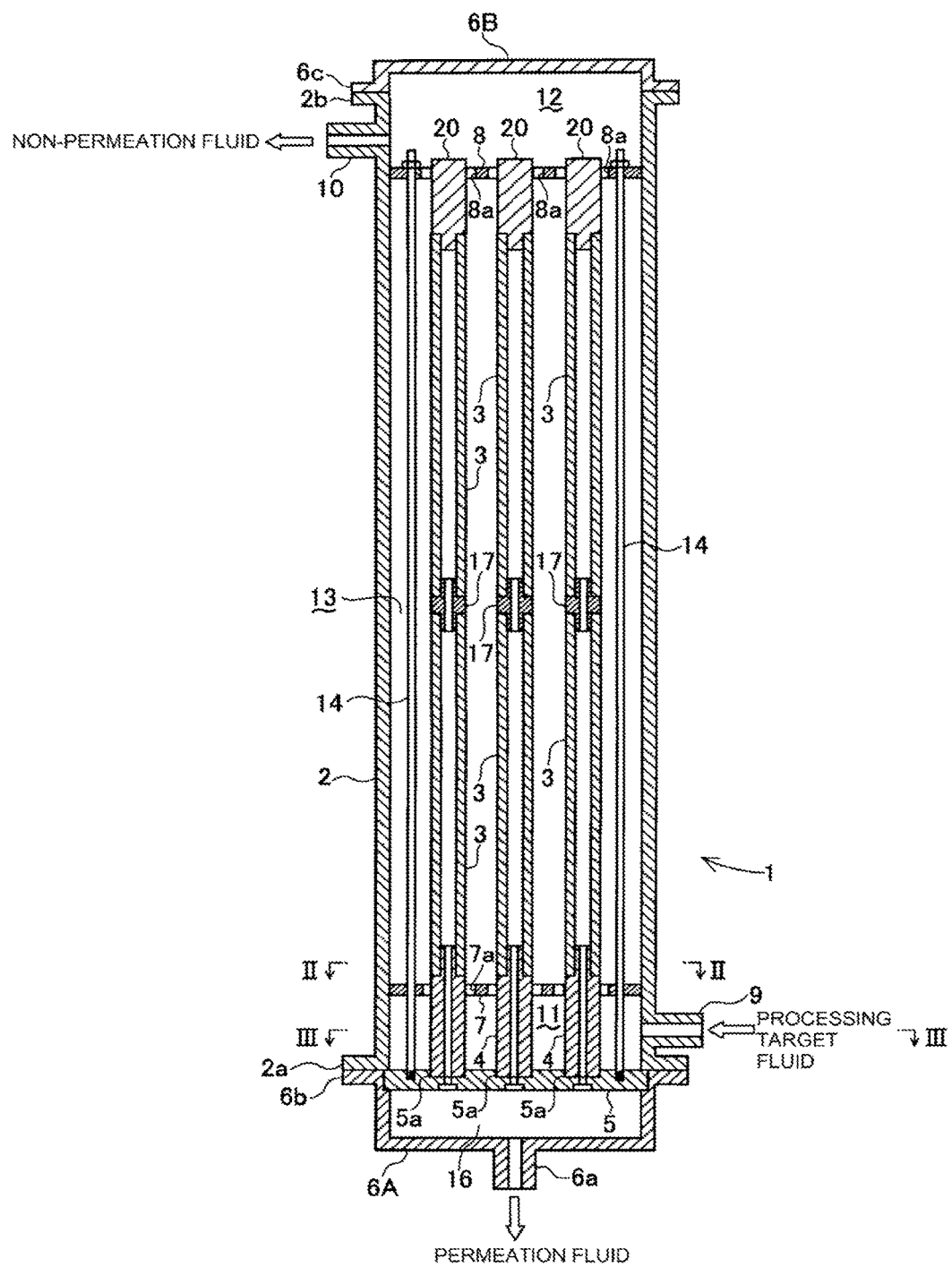
FIG. 19 is a sectional view, taken by a plane including the housing axial line, of the separation membrane module according to the third embodiment.

In this embodiment, end pipes 4 are connected to the bottom ends of the tubular separation membranes 3. End plugs 20 are connected to the top ends of the tubular separation membranes 3. As shown in FIG. 18, each tubular separation membrane 3 may be replaced by a tubular separation membrane connection body which is formed by connecting two tubular separation membranes 3 by a joint pipe 17. Although, for example, only seven tubular separation membranes 3 are shown in FIGS. 7 and 8, actually, only one tubular separation membrane 3 may be provided. A further alternative is a multitubular separation membrane module which is equipped with a number of (e.g., 2 to 3,000; and preferably 50 to 1,500) tubular separation membranes 3.

The outer circumferential surface of the housing 2 is formed with an inlet 9 and an outlet 10 of a processing target fluid at a bottom position and a top position, respectively. The inlet 9 is disposed so as to enable access to a room 11 which is formed between the support plate 5 and the first baffle 7. The outlet 10 is disposed so as to enable access to a room 12 which is formed over the second baffle 8. A main room 13 for membrane separation is formed between the baffles 7 and 8.

Plural rods 14 project upward from the bottom support plate 5, and the baffles 7 and 8 and the pressing plate 25 are supported by the rods 14. Bottom end portions of the rods 14 are formed with male screws which are threadedly engaged with female screw holes of the support plate 5, respectively. The baffles 7 and 8 and the pressing plate 25 are supported respectively by sheath pipes 14A, 14B, and 14C (see FIGS. 4 and 9) which are fitted with the rods 14, so as to be placed at prescribed heights. The sheath pipes 14A are disposed between the support plate 5 and the baffle 7. The sheath pipes 14B are disposed between the baffles 7 and 8. The sheath pipes 14C are disposed between the baffle 8 and the pressing plate 25. The baffle 8 is placed on the top end surfaces of the sheath pipes 14B. The pressing plate 25 is located over the baffle 8, placed on the top end surfaces of the sheath pipes 14C, and fixed to the top ends of the rods 14 by nuts 14n which are threadedly engaged with top end portions of the rods 14, respectively.

In this embodiment, sealing members such as O-rings, V-packings, or C-rings are sandwiched between the inner circumferential surface of the housing 2 and the outer circumferential surfaces of the baffles 7 and 8.

The baffles 7 and 8 are formed with circular insertion through-holes 7a and 8a for insertion of the tubular separation membranes 3, and connection bodies each of which is formed by connecting a tubular separation membrane 3, an end pipe 4, and an end plug 20 are inserted through the insertion through-holes 7a and 8a. The diameters of the insertion through-holes 7a and 8a are larger than the diameters (outer diameters) of the tubular separation membranes 3, the end pipes 4, and the end plugs 20, and hence gaps are formed between the inner circumferential surfaces of the insertion through-holes 7a and 8a and the outer circumferential surfaces of the end pipes 4 and the end plugs 20 over the entire circumferences. The number of baffles may be different than in this embodiment, and may be three or more.

The top surface of the support plate 5 is formed with insertion holes 5a in which bottom portions of the end pipes 4 which are connected to the respective tubular separation membranes 3 are inserted. The insertion holes 5a are cylindrical and extend from the top surface of the support plate 5 to a halfway position in its thickness direction. The bottoms of the insertion holes 5a communicate with the space below the support plate 5 via small holes 5b and large holes 5c. Sealing between the end pipes 4 and the insertion holes 5a is established by O-rings.

A pipe hole 4a of each end pipe 4 communicates with, via the small hole 5b and the large hole 5c, an outflow room 16 which is formed by the bottom cover 6A and the support plate 5. The bottom cover 6A is provided with an outlet 6a of a separated permeation fluid.

As shown in FIG. 10, the outer circumferential surface of a portion, close to its bottom end, of each end pipe 4 is formed with circumferential grooves 4b in which O-rings 30 made of a fluorine rubber, a fluorine resin, or the like are inserted. In this embodiment, plural grooves 4b are formed.

Sealing between the end pipes and the insertion holes is established by O-rings. More specifically, the bottom end surface of each end pipe 4 is formed with a circumferential groove 4c which is concentric with the pipe hole 4a and in which an O-ring 31 is inserted. Sealing is established between the outer surface of each end pipe 4 and the insertion hole 5a because the O-rings 30 are in close contact with the inner circumferential surface of the insertion hole 5a and the O-ring 31 is in close contact with the bottom surface of the insertion hole 5a. Only one of the set of O-rings 30 in contact with the outer circumferential surface of each end pipe 4 and the O-ring 31 in contact with the bottom end surface of the insertion hole 5a may be provided. That is, it is preferable that the end pipe 4 is connected to the support plate in such a manner that an O-ring(s) is inserted in a groove(s) which is formed in at least one of the outer circumferential surface and the end surface of the end pipe 4 and the end pipe which is provided with the O-ring(s) is inserted into the insertion hole.

As shown in FIGS. 9 and 10, a top end portion of each end pipe 4 is shaped into a small-diameter portion 4g which is inserted in a bottom portion of the tubular separation membrane 3. Sealing between the end pipe 4 and the tubular separation membrane 3 is established by O-rings. An O-ring 32 is inserted in a circumferential groove which is formed in the outer circumferential surface of the small-diameter portion 4g. An O-ring 33 is sandwiched between the bottom end surface of the tubular separation membrane 3 and the step surface of the end pipe 4. Sealing between the end pipe 4 and the tubular separation membranes 3 may be established without using such O-rings; that is, using a heat-shrinkable tube or using both of such O-rings and a heat-shrinkable tube.

Figure 3:
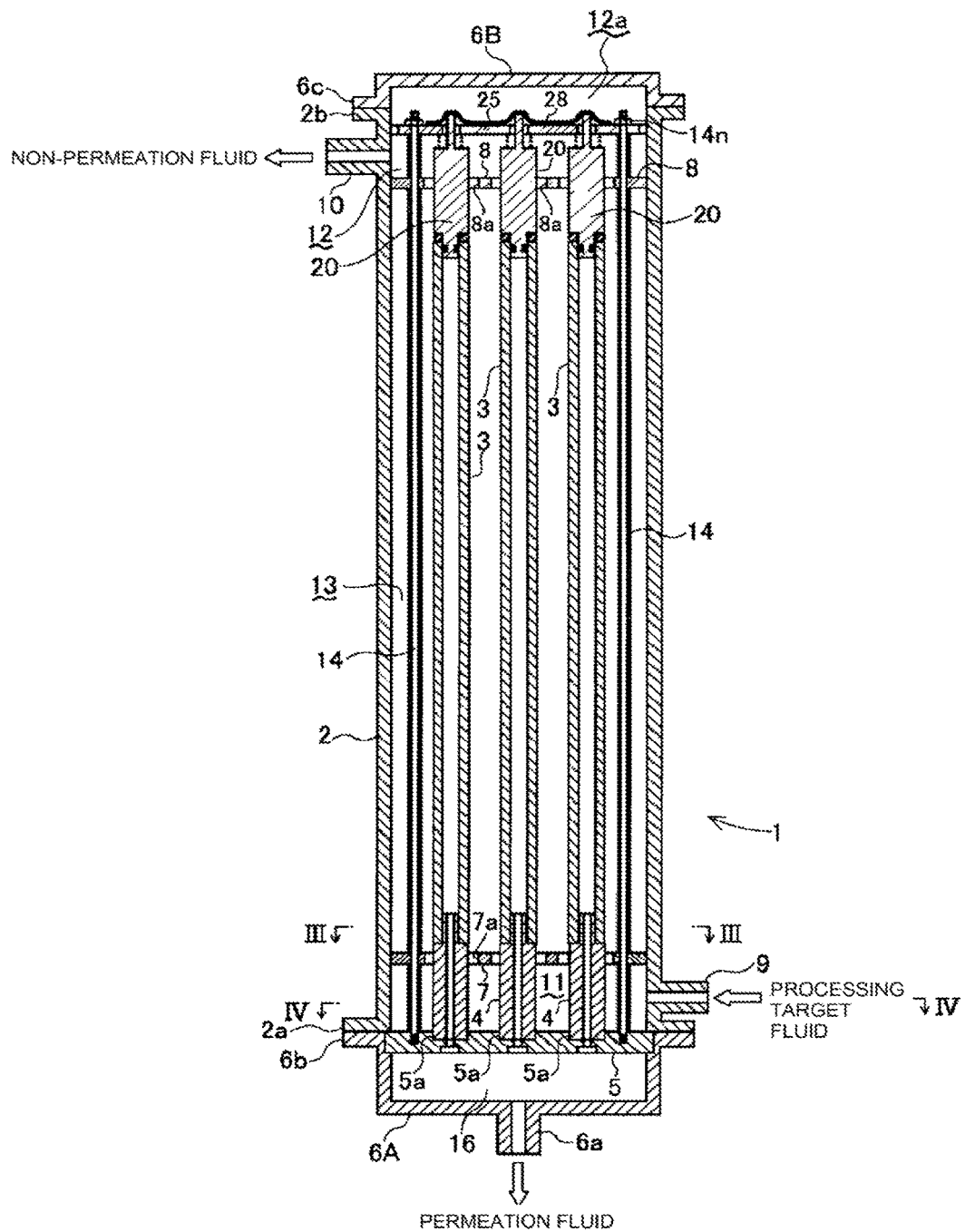
FIG. 3 is a sectional view, taken by a plane including a housing axial line, of a separation membrane module according to a second embodiment.
Figure 4:
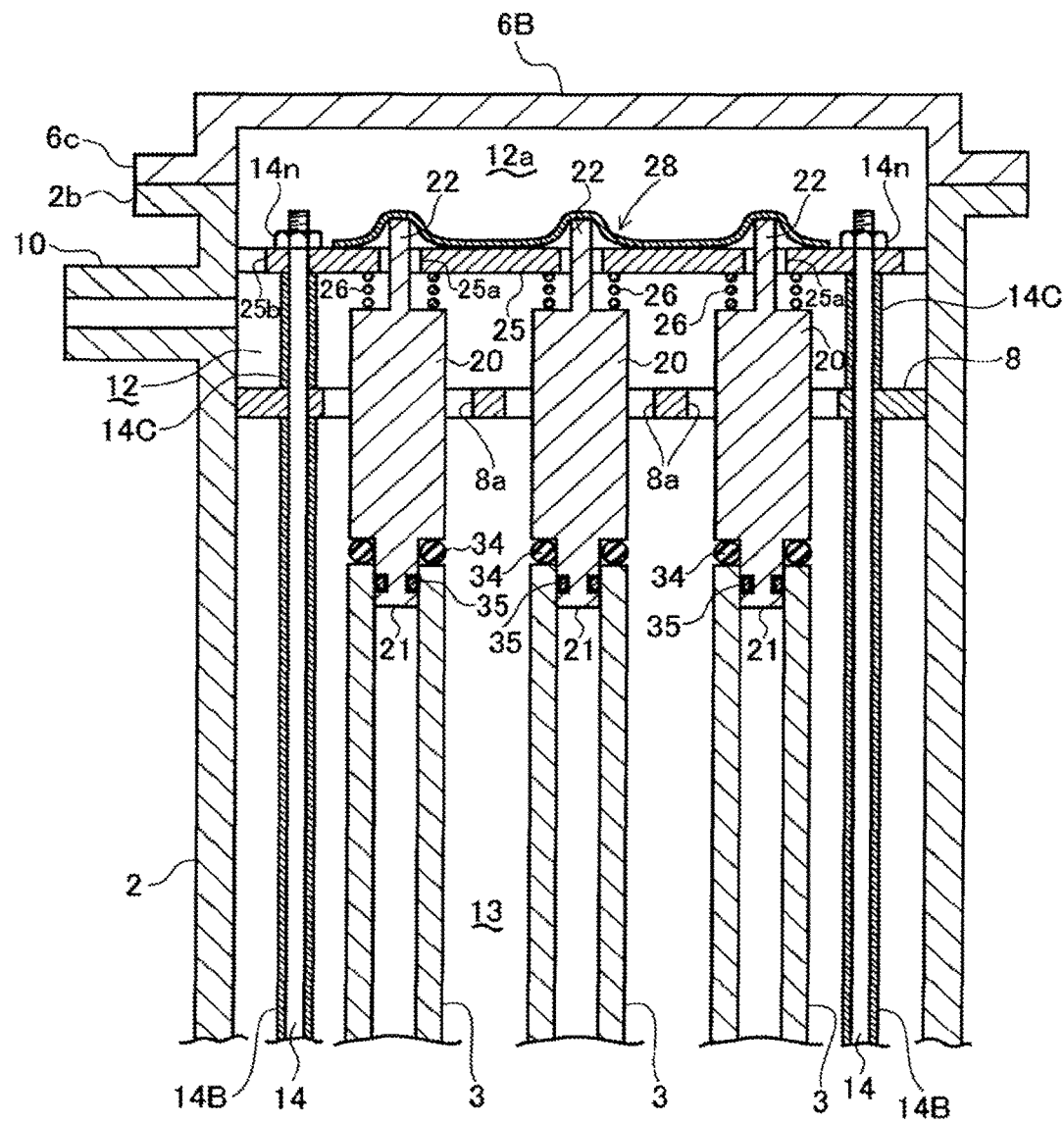
FIG. 4 is an enlarged view of a top part of FIG. 3.
Figure 5:
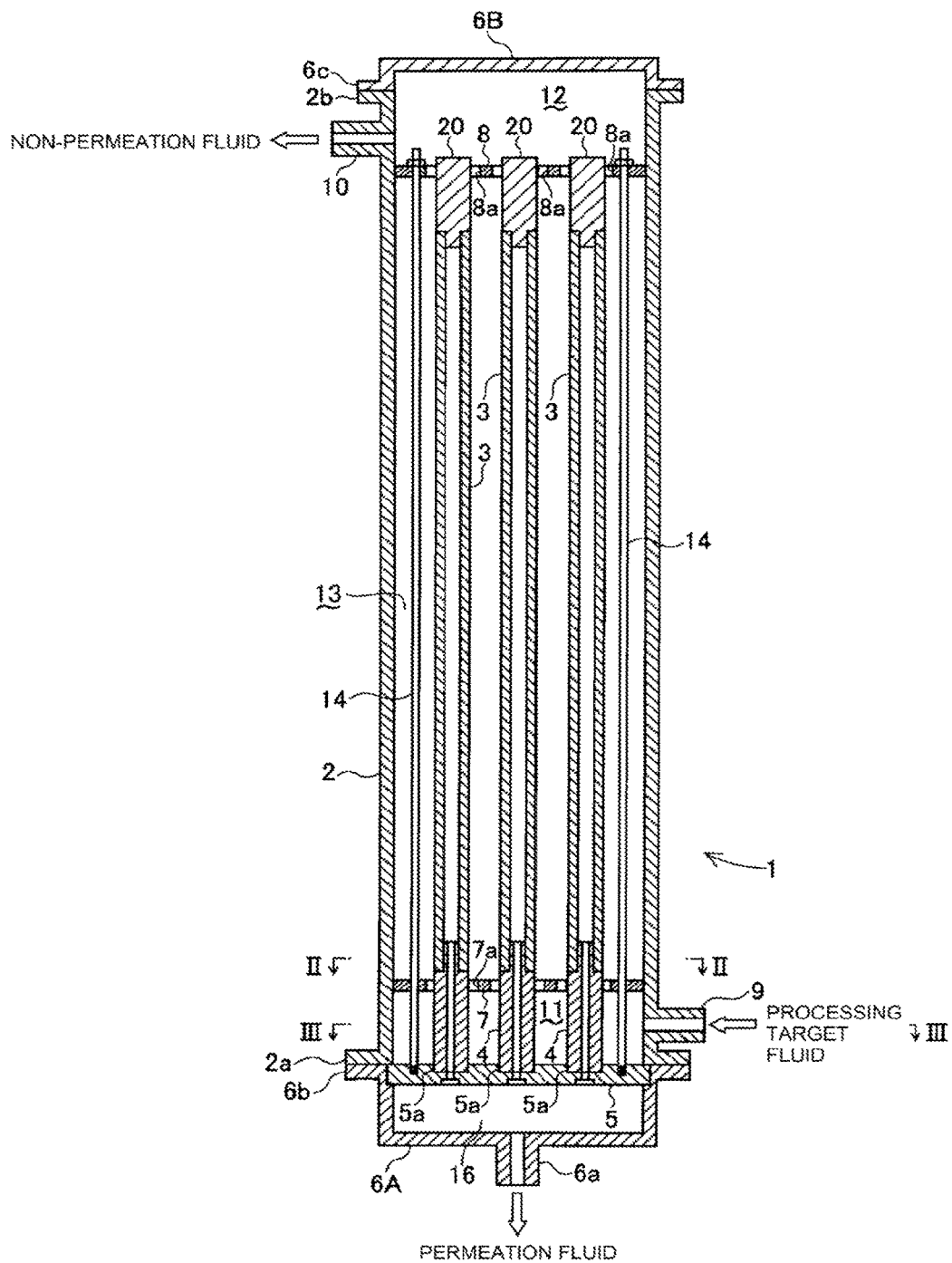
FIG. 5 is a sectional view, taken by a plane including a housing axial line, of a separation membrane module according to a third embodiment.

As shown in FIGS. 3 and 4, the end plug 20 is connected to a top end portion of the upper tubular separation membrane 3. The end plug 20, which is cylindrical or has a shape obtained by cutting out portions of a cylinder, seals the tubular separation membrane 3 at its top. A bottom end portion of the end plug 20 is formed with a small-diameter portion 21 which is inserted in the tubular separation membrane 3. Sealing between the end plug 20 and the tubular separation membrane 3 is established by O-rings 34 and 35. The sealing structure of the end plug 20 and the tubular separation membrane 3 is the same as that of the small-diameter portion 4g of the end pipe 4 and the tubular separation membrane 3. Sealing between the end plug 20 and the tubular separation membranes 3 may be established without using O-rings; that is, using a heat-shrinkable tube or using both of the O-rings and a heat-shrinkable tube.

A rod 22 projects upward from the center of the top end surface of the end plug 20. The pressing plate 25 which is located over the end plug 20 is formed with an opening 25a in which the rod 22 is inserted. The rod 22 is smaller in diameter than the opening 25a, and hence a gap is formed between the rod 22 and the inner circumferential surface of the opening 25a.

The circumferential edge of the pressing plate 25 is formed with cuts 25b which allow the room 12 under the pressing plate 25 and a room 12a over the pressing plate 25 to communicate with each other.

The tubular separation membrane 3 is provided with an absorption absorbing member, which is preferably a sheet-like member. For example, the rods 22 somewhat project upward with respect to the pressing plate 25. The top surface of the pressing plate 25 is covered with a vibration absorbing sheet 28 which is made of a soft material, and the top end portions of the rods 22 are in contact with the vibration absorbing sheet 28. The vibration absorbing sheet 28 is a sheet made of a viscoelastic material such as a gel sheet, a rubber sheet, or a sponge sheet.

A compression coil spring 26 is sandwiched between the top end surface of the end plug 20 and the bottom surface of the pressing plate 25 so as to surround the rod 22. The end plug 20 is urged downward by the spring 26. With this measure, the end plug 20 is prevented from coming out even if the internal pressure of the tubular separation membrane 3 is increased due to a certain reason and a force acts on the end plug 20 in such a direction as to cause it to come out of the tubular separation membrane 3. Likewise, the upper tubular separation membrane 3 is prevented from coming out of the joint pipe 17 and the joint pipe 17 is prevented from coming out of the lower tubular separation membrane 3.

When each tubular separation membrane 3 expends or contracts thermally, the spring 26 contracts or expands accordingly.

As described above, in the embodiment shown in FIG. 18, plural (e.g., two) tubular separation membranes 3 are connected to each other by joint pipes 17. The joint pipe 17 has a through-hole that penetrates through it in its axial direction. Both end portions (top and bottom end portions) of the joint pipe 17 are small-diameter portions which are inserted in the tubular separation membranes 3. The outer circumferential surface of each small-diameter portion is formed with a circumferential groove in which an O-ring (not shown) is inserted. Sealing between the joint pipe 17 and the tubular separation membranes 3 may be established without using an O-ring; that is, using a heat-shrinkable tube or by using both of the O-ring and a heat-shrinkable tube.

The portion, between the small-diameter portions as the two end portions of the joint tube 17, of the joint tube 17 is a large-diameter portion and step surfaces are formed between the large-diameter portion and the respective small-diameter portions. O-rings (not shown) are also sandwiched between the step surfaces and the end surfaces of the tubular separation membranes 3, respectively.

To assemble this separation membrane module 1, for example, the end pipes 4, the tubular separation membranes and the end plugs 20 are inserted into the respective insertion holes 5a of the support plate 5 in order so that they project upward from the support plate 5. Air-tight or liquid-tight connection between the support plate 5 and the end pipes 4 can be made easily by merely inserting the bottom end portions of the end pipes 4 into the insertion holes 5a. Since the insertion holes 5a are cylindrical, work of forming the insertion holes 5a of the support plate 5 can be done easily and hence the support plate 5 can be manufactured easily. This contributes to shortening of a manufacturing period of the separation membrane module and reduction of its manufacturing cost.

After causing the connection bodies of an end pipe 4, a tubular separation membrane 3, and an end plug 20 to project upward from the support plate 5, the pressing plate 25 is put on with the springs 26 sandwiched between them and the nuts 14n are screwed. Then the pressing plate 25 is covered with the vibration absorbing sheet 28 and the top cover 6B is attached.

In the thus-configured separation membrane module 1, a processing target fluid is introduced into the room 11 of the housing 2 through the inlet 9, flows into the main room 13 through the gaps between the inner circumferential surfaces of the insertion through-holes 7a of the baffle 7 and the outer circumferential surfaces of the end pipes 4, goes along the main room 13, and flows into the room 12 through the gaps between the insertion through-holes 8a of the baffle 8 and the end plugs 20. As the processing target fluid flows along the main room 13, part of its components permeate the tubular separation membrane 3 and are taken out through the outflow room 16 and the outlet 6a. The other part, which is not permeated the tubular separation membranes 3, of the components of the fluid flow out of the separation membrane module 1 through the outlet 10.

In this embodiment, since the vibration absorbing member, preferably the vibration absorbing sheet 28, is provided, vibration of the tubular separation membranes 3 is prevented, whereby generation of an abnormal sound and early deterioration of the sealing portions, the support bodies, and the tubular separation membranes is prevented. It is preferable that the vibration absorbing member be disposed so as to be in contact with the end plugs 20. In this embodiment, the end pipe 4 and the end plug 20 which are connected to the two respective ends of tubular separation membrane 3 are inserted through the insertion through-holes 7a and 8a of the baffles 7 and 8. Thus, even if the tubular separation membrane 3 is vibrated or swung and the end pipe 4 and the end plug 20 come into contact with the inner circumferential surfaces of the insertion through-holes 7a and 8a, a zeolite membrane is not damaged. As a result, a stable operation is enabled for a long time.

In this embodiment, since each end plug 20 is attached to the top end portion of the tubular separation membrane 3 and urged downward by the spring 26, loads act on the tubular separation membrane 3, the end plug 20, the end pipe 4, and the joint pipe 17 in such directions that they are pressed against each other. As a result, the degree of sealing between them is high and, as mentioned above, a phenomenon can be prevented that the end plug 20, the tubular separation membrane 3, or the joint pipe 17 comes out when the internal pressure of the tubular separation membrane 3 is increased.

A flow in the main room 13 and flows in the tubular separation membranes 3 may be in either the same direction or opposite directions, and the inlet 9 and the outlet 10 for a processing target fluid may be interchanged.

In this embodiment, membrane separation can be performed efficiently because a number of tubular separation membrane 3 are arranged parallel with each other and hence the total membrane area is large.

Although in this embodiment sealing between each tubular separation membrane 3 and each of the end pipe 4 and the end plug 20 is established by the O-rings, sealing between them can be established by connecting them by a heat-shrinkable tube.

Although the above embodiment employs the springs 26, the springs 26 may be omitted in a case that the interval between the pressing plate 25 and the top end surfaces of the end plugs 20 is small. In this case, when the end plug 20 is moved upward due to increase of the internal pressure of a tubular separation membrane 3, the top end surface of the end plugs 20 hits the pressing plate 25 and is thereby prevented from coming out.

Although in the above embodiment the springs 26 push the end plugs 20, springs which pull the end plugs 20 and the end pipes 4 may be disposed inside the tubular separation membranes 3, respectively.

In the separation membrane module 1 according to the invention, it is possible to input a processing target fluid through the outlet 10 and output a non-permeation fluid through the inlet 9.

Figure 16:
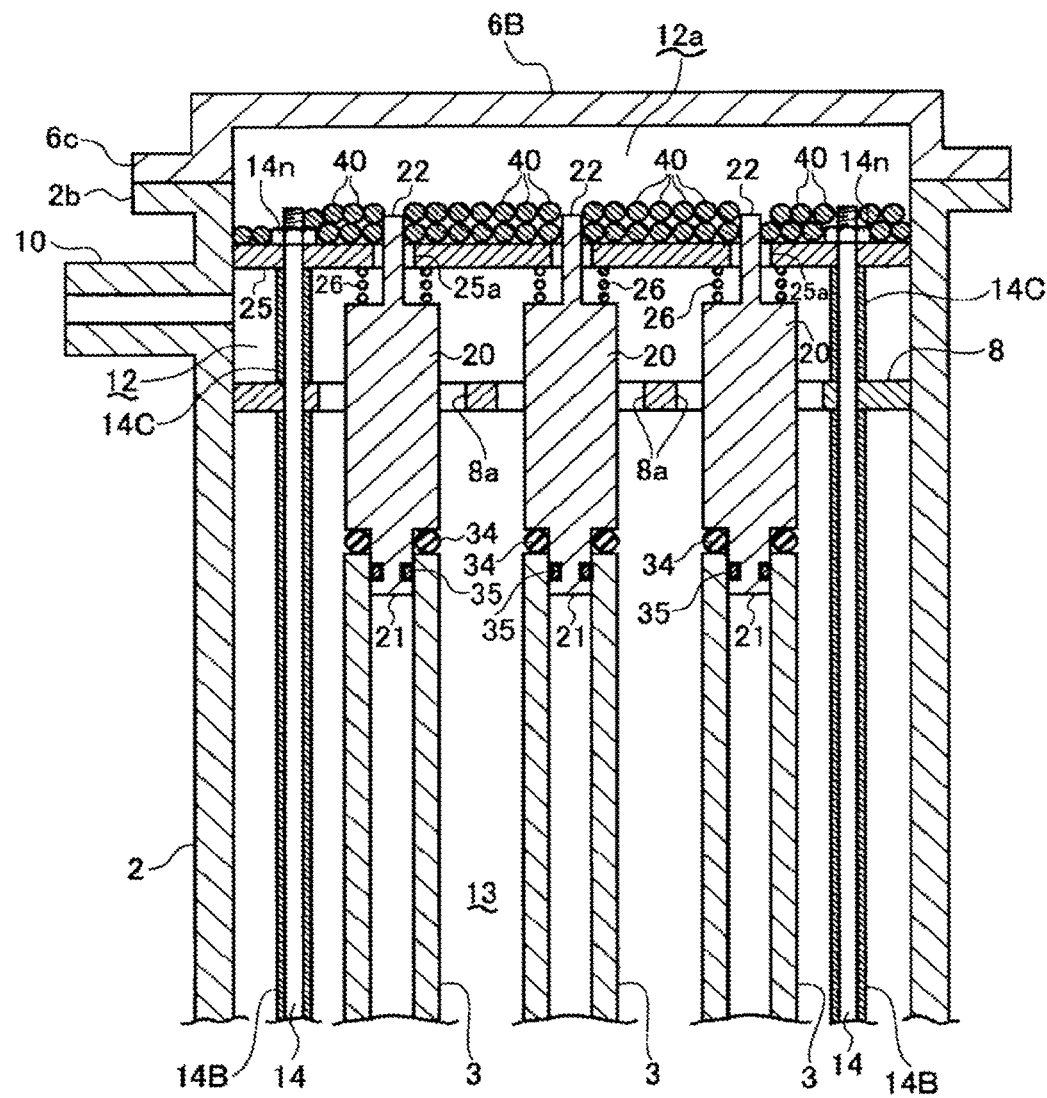
FIG. 16 is an enlarged view of a separation membrane module according to an embodiment relating to the second embodiment.

Although the above embodiment employs the vibration absorbing sheet 28 as the vibration absorbing member, another kind of vibration absorbing member may be employed as exemplified in FIG. 16.

FIG. 16 shows a configuration in which the vibration absorbing sheet 28 is omitted and, instead, ball (spherical body)-like vibration absorbing bodies 40 which are made of a viscoelastic material such as gel, rubber, or sponge are laid on the top surface of the pressing plate 25 so as to surround and be in contact with top end portions of the rods 22. Although the pressing plate 25 is not formed with cuts 25b, it may be formed with cuts 25b. The other part of the configuration shown in FIG. 16 is the same as that shown in FIG. 4, and the same symbols in these drawings denote the same component or portion. Also in this embodiment, vibration of the tubular separation membranes 3 is absorbed by the vibration absorbing bodies 40.

Figure 17:
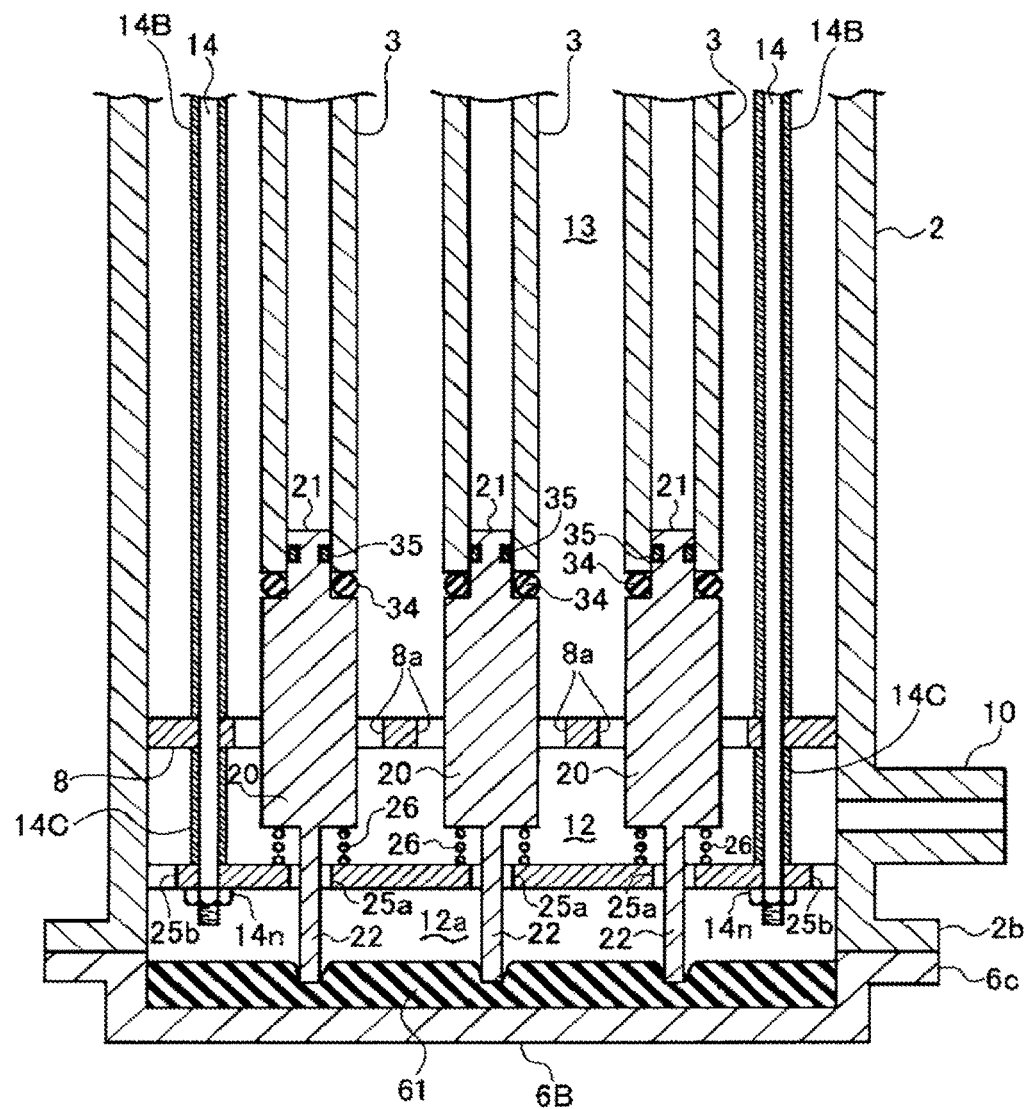
FIG. 17 is an enlarged view of a separation membrane module according to an embodiment relating to the second embodiment.

Although the above embodiment employs the configuration that the tubular separation membranes 3 project upward from the support plate 5, another configuration is possible in which a support plate is disposed above in a separation membrane module and tubular separation membranes hang from the support plate. FIG. 17 shows an example of such a structure.

FIG. 17 shows a bottom part of a separation membrane module which is configured in such a manner that the separation membrane module shown in FIGS. 3, 4, and 7-9 is disposed upside down. In this separation membrane module, a vibration absorbing sheet 61 is laid on the top cover 6B. The vibration absorbing sheet 61 is a viscoelastic member having a prescribed thickness. Bottom end portions of the rods 22 are pushed in the vibration absorbing sheet 61. Vibration of the tubular separation membranes 3 is absorbed by the vibration absorbing sheet 61. That is, it is preferable that the vibration absorbing member be disposed on the opposite side of the pressing plate to the tubular separation membranes and the end plugs or the rods be in contact with the vibration absorbing member.

The other part of the configuration of the separation membrane module shown in FIG. 17 is the same as that shown in FIGS. 3, 4, and 7-9, and the other symbols in FIG. 17 denote the same components or portions as those in FIG. 4. The manner of flow a fluid and the fluid separating operation of the separation membrane module shown in FIG. 17 are the same as those of the separation membrane module 1 shown in FIGS. 3, 4, and 7-9. The cuts 25b may be omitted.

Although in each of the above embodiments thin-rod-like rods 22 project from the respective end plugs 20, another configuration is possible in which the rods 22 are omitted and the openings 25a are made so large that tip portions themselves of the end plugs 20 can be inserted into the openings 25a.

Materials etc. suitable for the individual members constituting the separation membrane module according to the invention will be described below.

Example materials of the end pipes 4 and the end plugs 20 are ones which do not permeate a fluid, such as a metal, a ceramic, and a resin; however, the materials of the end pipes 4 and the end plugs 20 are not limited to them. Although the materials of the baffles 7 and 8 and the joint pipes 17 are ordinarily metal materials such as stainless steel, there are no particular limitations on them except that they should be heat-resistant under separation conditions and resistant to components supplied and permeation components. For certain uses, they may be changed to other materials such as resin materials.

It is preferable that each tubular separation membrane 3 have a tubular porous support body and a zeolite membrane as an inorganic separation membrane formed on the outer circumferential surface of the porous support body. Examples of the tubular porous support body are inorganic porous support bodies which are ceramic sintered bodies or metal sintered bodies containing silica, ç-alumina, γ-alumina, mullite, zirconia, titania, yittria, silicon nitride, silicon carbide, etc. Among them, inorganic porous support bodies containing at least one of alumina, silica, and mullite are preferable. There are no particular limitations on the average pore diameter in the surface of the porous support body. However, it is preferable that the pore diameter be controlled, and that the pore diameter be ordinarily larger than or equal to 0.02 µm, preferably larger than or equal to 0.05 µm, and even preferably larger than or equal to 0.1 µm and be ordinarily smaller than or equal to 20 µm, preferably smaller than or equal to 10 µm, and even preferably smaller than or equal to 5 µm.

A zeolite membrane is formed on the surface of the porous support body by crystallizing zeolite. The zeolite as the main component of the zeolite membrane ordinarily contains zeolite having a 6 to 10-membered oxygen ring structure and preferably contains an 6 to 8-membered oxygen ring structure.

The parameter n of zeolite having an n-membered oxygen ring means one which is largest in the number of oxygens among pores which are formed by oxygens and T elements which constitute a zeolite framework. For example, where zeolite having 12-membered oxygen ring pores and 8-membered oxygen ring pores, such as MOR zeolite, is regarded as 12-membered oxygen ring zeolite.

Examples of zeolite having a 6 to 10-membered oxygen ring structure are AET, AEL, AFG, ANA, BRE, CAS, CDO, CHA, DAC, DDR, DOH, EAB, EPI, ESV, EUO, FAR, FRA, FER, GIS, GIU, GOO, HEU, IMF, ITE, ITH, KFI, LEV, LIO, LOS, LTN, MAR, MEP, MER, MEL, MFI, MFS, MON, MSO, MTF, MTN, MTT, MWW, NAT, NES, NON, PAU, PHI, RHO, RRO, RTE, RTH, RUT, SGT, SOD, STF, STI, STT, TER, TOL, TON, TSC, TUN, UFI, VNI, VSV, WEI, and YUG.

The zeolite membrane may be any of a membrane made of zeolite only, a membrane formed by dispersing a zeolite powder in a binder such as a polymer, and a zeolite membrane composite body formed by fixing membrane-like zeolite on any of various support bodies. The zeolite membrane may contain amorphous components etc. partially.

There is no particular limitation for the thickness of the zeolite membrane. However, the zeolite membrane thickness is ordinarily larger than or equal to 0.1 µm, preferably larger than or equal to 0.6 and even preferably larger than or equal to 1.0 µm, and is usually smaller than or equal to 100 µm, preferably smaller than or equal to 60 µm, more preferably smaller than or equal to 20 µm, particularly preferably smaller than or equal to 10 µm, and most preferably smaller than or equal to 5 µm.

It is noted that in the invention tubular separation membranes having a separation membrane other than the zeolite membrane.

The outer diameter of each tubular separation membrane 3 is preferably larger than or equal to 3 mm, much preferably larger than or equal to 6 mm, and far preferably larger than or equal to 10 mm, and is preferably smaller than or equal to 20 mm, more preferably smaller than or equal to 18 mm, and further more preferably smaller than or equal to 16 mm. If the outer diameter is too small, each tubular separation membrane 3 may be insufficient in strength and hence prone to break. If the outer diameter is too large, each tubular separation membrane 3 may be prone to decrease in the membrane area per module.

The length of a portion, covered with the zeolite membrane, of each tubular separation membrane 3 is preferably longer than or equal to 20 cm and even preferably shorter than or equal to 200 cm.

In the separation membrane module according to the invention, it is preferable that 1 to 3,000 tubular separation membranes are provided usually, and that the tubular separation membranes are arranged in such a manner that their shortest distance is 2 to 10 mm. The size of the housing and the number of tubular separation membranes are changed as appropriate according to the flow amount of a fluid to be processed. The joining of tubular separation membranes by a joint pipe 17 is not indispensable.

In the separation membrane module according to the invention, there are no particular limitations on the processing target fluid to be separated or condensed, that is, it may be any mixture, except that it should be a gas or liquid mixture consisting of plural components and can be separated or condensed by a separation membrane. However, it is preferable that it is used for a gas mixture.

The separation or condensation method may be a method called a pervaporation method or a vapor permeation method. Being a separation or condensation method in which a liquid mixture itself is introduced into a separation membrane, the pervaporation method can simplify a process including separation or condensation.

In the invention, in the case where a mixture to be separated or condensed is a gas mixture consisting of plural components, examples gas mixtures are ones containing at least one component selected from carbon dioxide, oxygen, nitrogen, hydrogen, methane, ethane, ethylene, propane, propylene, normal butane, iso-butane, 1-butene, 2-butene, iso-butene, an aromatic compound such as toluene, sulfur hexafluoride, helium, carbon monoxide, nitrogen monoxide, and water. Of a mixture consisting of such gas components, gas components which are high in permeance permeate the separation membrane and are thereby separated and gas components which are low in permeance remain on the supply gas side and hence are condensed.

Separation membrane modules according to the invention can be used being connected to each other according to the fluid flow rate or the intended degree of separation or condensation. Where a fluid flow rate or an intended degree of separation or condensation of a processing target fluid is so high that it cannot be processed sufficiently by a single module, it is preferable to make piping so that a fluid which is output from the outlet of one module is supplied to the inlet of another module. Even more modules can be connected to each other according to, that is, to attain, an intended degree of separation or condensation.

A separation membrane module according to a third embodiment of the invention is based on the separation membrane module according to the first or second embodiment in which the end pipe is connected to the one end portion of the tubular separation membrane and the end pipe projects from one plate surface of the support plate which is disposed so as to traverse the housing. The separation membrane module is further characterized in that the end pipe is inserted in an insertion hole which is formed in the one plate surface of the support plate, and sealing is established between the end pipe and the insertion hole by an O-ring.

It is preferable that the O-ring is inserted in a groove which is formed in one of an outer circumferential surface and an end surface of the end pipe, and the end pipe and the support plate be connected to each other by insertion, in the insertion hole, of the end pipe to which the O-ring is attached.

A separation membrane module according to a fourth embodiment of the invention is based on the separation membrane module according to the first, second, or third embodiment, and is characterized in that the housing is provided with an opening and closing member which can be opened and closed, and a closing member can be attached to a permeation fluid output portion of the tubular separation membrane via the opening and closing member.

In each of the first to fourth embodiments, it is preferable that the fluid is a gas mixture.

The invention also relates to a method for repairing the separation membrane module according to the fourth embodiment. When the separation membrane module has been damaged, the opening and closing member is opened and the closing member is attached to the permeation fluid output portion of the damaged tubular separation membrane.

The separation membrane module according to the fourth embodiment of the invention will be described below with reference to FIGS. 6-9, 20 and 21. However, the scope of the invention is not limited to this.

In this embodiment, to reduce the weight of each end plug 20, a recess 20v is formed so as to extend from the top end surface of the end plug 20. Drain holes may be formed so as to allow a bottom portion of the recess 20v to communicate with the outside of the side circumferential surface of the end plug 20.

In this embodiment, the bottom cover 6A constitutes an opening and closing member and each of "holes" of the support plate 5 is formed by an insertion hole 5a, a small hole 5b, and a large hole 5c. Although in this embodiment the terms "small hole" and "large hole" are used, configurations different than in this embodiment are possible in which the holes 5b and 5c have the same diameter (size) or the hole 5b is larger than the hole 5c.

In this embodiment, since the end plug 20 is disposed on the top end side of each tubular separation membrane 3, loads are imposed on the tubular separation membrane 3, the end plug 20, and the end pipe 4 in such directions that their end surfaces are pressed against each other.

However, in the embodiment, a configuration is possible in which the end pipe 4 and the support plate 5 are disposed on the top end side of each tubular separation membrane 3 and the end plug 20 is disposed on the bottom end side of the tubular separation membrane 3. In this case, it is preferable to employ an urging member such as a spring for urging the end plug 20 upward so that loads are imposed on the tubular separation membrane 3, the end plug 20, and the end pipe 4 in such directions that their end surfaces are pressed against each other.

In this embodiment, the connection bodies of a tubular separation membrane 3, an end pipe 4, and an end plug 20 are caused to project upward from the support plate 5 by inserting the bottom end portion of their end pipes 4 into the insertion holes 5a of the support plate 5. Air-tight or liquid-tight connection between the support plate 5 and the end pipes 4 can be made easily by merely inserting the bottom end portions of the end pipes 4 into the insertion holes 5a. Since the insertion holes 5a are cylindrical, work of forming the insertion holes 5a of the support plate 5 can be done easily and hence the support plate 5 can be manufactured easily. This contributes to shortening of a manufacturing period of the separation membrane module and reduction of its manufacturing cost.

In the thus-configured separation membrane module 1, a processing target fluid is introduced into the room 11 of the housing 2 through the inlet 9; flows into the main room 13 through the gaps between the inner circumferential surfaces of the insertion through-holes 7a of the baffle 7 and the outer circumferential surfaces of the end pipes 4; goes along the main room 13; and flows into the room 12 through the gaps between the insertion through-holes 8a of the baffle 8 and the end plugs 20. As the processing target fluid flows along the main room 13, part of its components permeate the tubular separation membrane 3 and are taken out through the outflow room 16 and the outlet 6a. The other part, not having permeated the tubular separation membranes 3, of the components of the fluid flow out of the separation membrane module 1 through the outlet 10. The outlet 6a may be attached not to the bottom cover 6A but to a portion, adjoining the outflow room 16, of the housing.

A flow in the main room 13 and flows in the tubular separation membranes 3 may be in either the same direction or opposite directions, and the inlet 9 and the outlet 10 for a processing target fluid may be interchanged.

Figure 6:
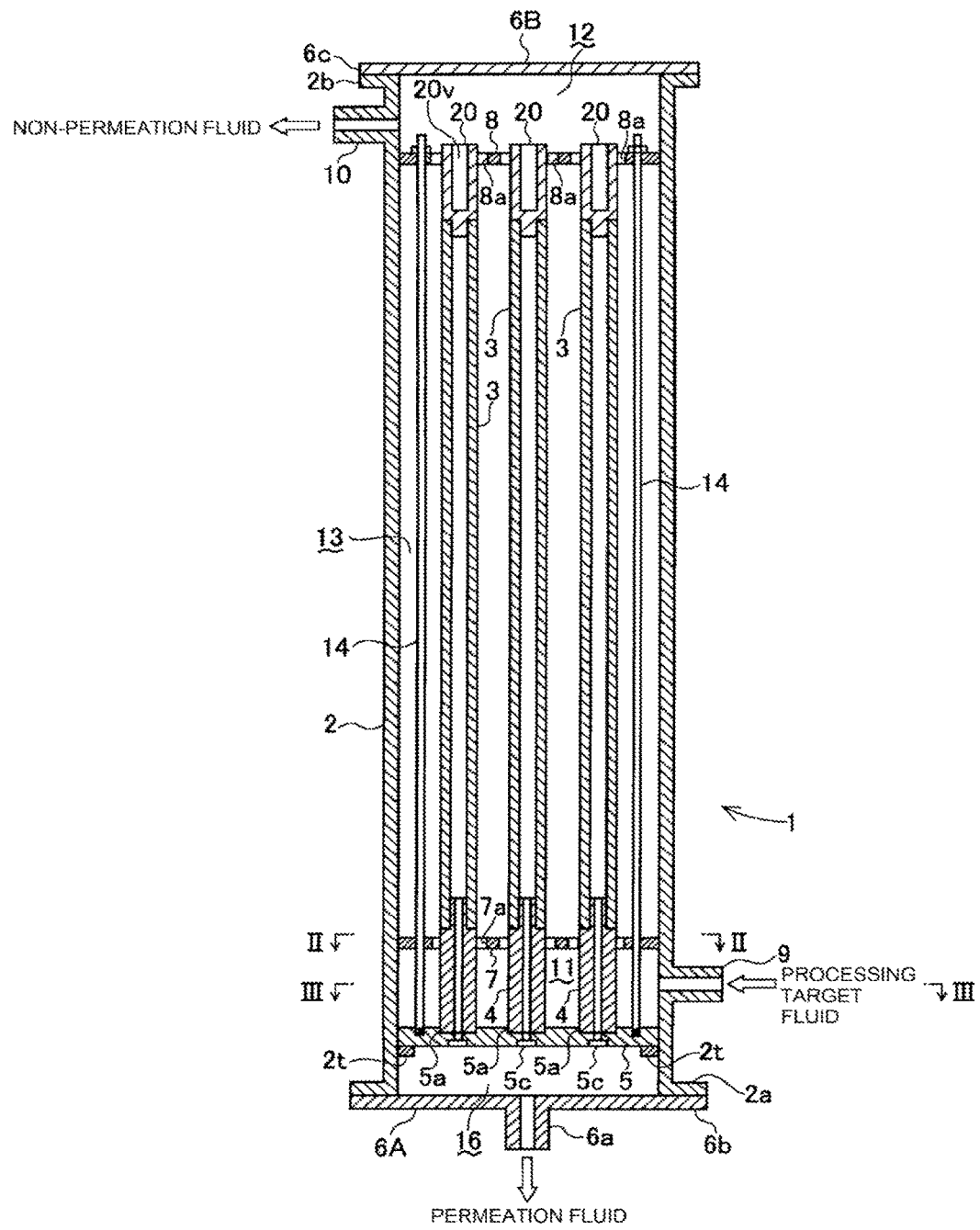
FIG. 6 is a sectional view, taken by a plane including a housing axial line, of a separation membrane module according to a fourth embodiment.

As shown in FIG. 6, the separation membrane module 1 can be used with the top cover 6B up. Alternatively, the separation membrane module 1 may be used even if it is used with the bottom cover 6A up. Furthermore, the separation membrane module 1 may be installed horizontally so that the direction connecting the bottom cover 6A and the top cover 6B is approximately horizontal.

In this embodiment, membrane separation can be performed efficiently because a number of tubular separation membrane 3 are arranged parallel with each other and hence the total membrane area is large.

In this embodiment, the end plug 20 and the end pipe 4 which are connected to the two respective ends (top and bottom ends) of each tubular separation membrane 3 are inserted through the insertion through-holes 7a and 8a of the baffles 7 and 8. Thus, even if the tubular separation membrane 3 is vibrated or swung and the end pipe 4 and the end plug 20 come into contact with the inner circumferential surfaces of the insertion through-holes 7a and 8a, a zeolite membrane is not damaged. As a result, a stable operation is enabled for a long time.

In the separation membrane module 1, if one or a small number of tubular separation membranes 3 are damaged, a processing target fluid flows into the damaged tubular separation membrane(s) 3 and is mixed with a permeation fluid existing there. Should such damaging of a tubular separation membrane(s) have occurred, an opening and closing member which is attached to the housing 2 so as to be openable and closable is opened and the flow of the processing target fluid into the housing 2 is stopped. Then the bottom cover 6A is detached from the housing 2. Subsequently, a closing member is inserted into the large hole 5c which communicates with the insertion hole 5a to which the tubular separation membrane 3 is inserted. In this manner, a closing member can be attached to a permeation fluid output portion of each tubular separation membrane via the opening and closing member.

When a tubular separation membrane is damaged, the separation membrane module can be repaired by opening the opening and closing member and attaching a closing member to the permeation fluid output portion of the damaged tubular separation membrane. Examples of the closing member will be described with reference to FIGS. 20(a)-20(d) and 21.

Figure 20A:
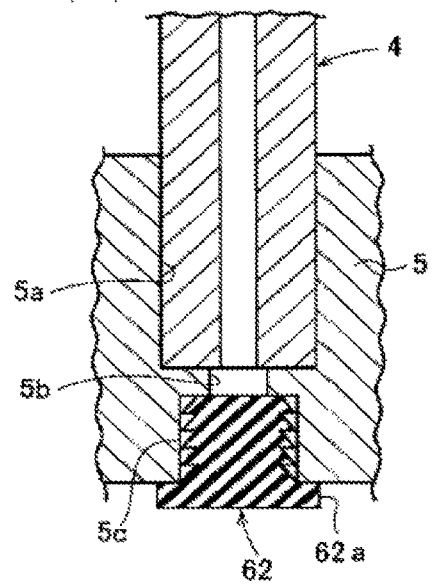
FIGS. 20(A)-20(D) are sectional views showing how the separation membrane module according to the fourth embodiment is closed by a closing member.

In the example of FIG. 20(a), a plug-shaped closing member 62 which is made of a soft material such as a rubber or a synthetic resin is pushed into the large hole 5c. The side circumferential surface of a portion, to be inserted into the large hole 5c, of the closing member 62 has a saw-tooth-shaped cross section. Thus, the closing member 62 has such a structure as to be inserted into the large hole 5c easily and not to come out of the large hole 5c easily. The rear end of the closing member 62 is formed with a flange 62a. The closing member 62 is pushed into the large hole 5c until the flange 62a comes into close contact with the bottom surface of the support plate 5, whereby pushing of the closing member 62 to a prescribed depth can be confirmed.

Figure 20B:
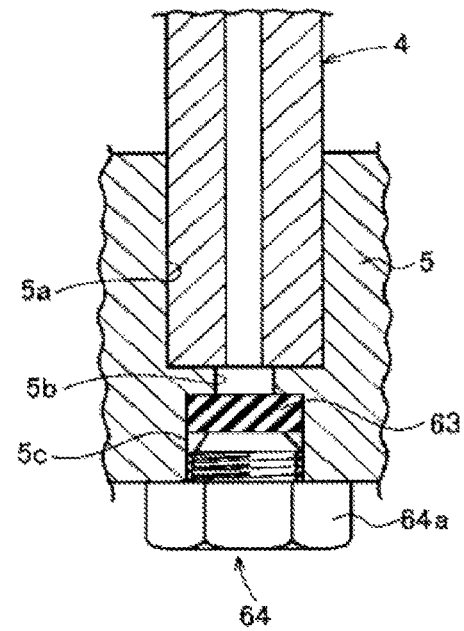

In the example of FIG. 20(b), a closing member is composed of a disc-shaped packing 63 which is pushed into the large hole 5c to its deepest position and a screw 64 which is screwed into the large hole 5c by self-tapping. After the packing 63 is pushed into the large hole 5c, the screw 64 is inserted into the large hole 5c and rotated with being pushed strongly, whereby the male threads on the outer circumferential surface of the tip portion of the screw 64 are advanced with being screwed into the inner circumferential surface of the large hole 5c. Thus, the screw 64 is attached to the large hole 5c. The screw 64 is advanced until its head 64a comes into close contact with the bottom surface of the support plate 5, whereby the packing 63 is pressed against the step surface formed at the boundary between the small hole 5b and the large hole 5c.

Figure 20C:
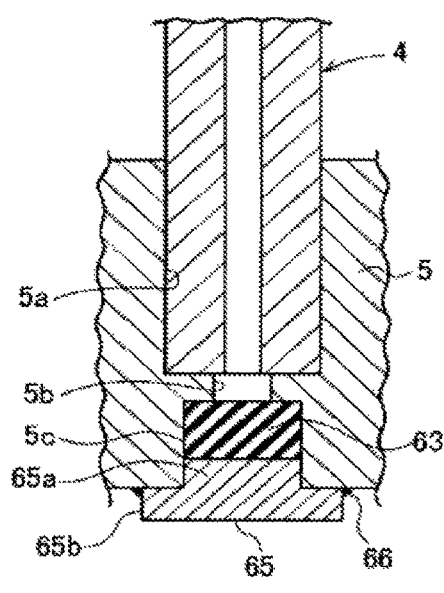

In the example of FIG. 20(c), a closing member is composed of a packing 63 and a plug 65 made of a metal or the like. After the packing 63 is pushed into the large hole 5c, a small-diameter portion 65a of the plug 65 is inserted and pushed into the large hole 5c until a large-diameter portion 65b reaches the bottom surface of the support plate 5, whereby the packing 63 is pressed against the above-mentioned step surface. In this state, the large-diameter portion 65b is fixed to the support plate 5 by fastening means 66 such as welding, brazing, or the like.

Figure 20D:
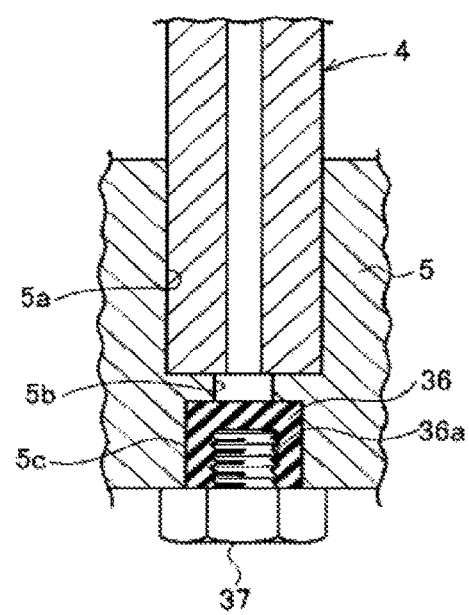

In the example of FIG. 20(d), a closing member is composed of a packing 36 and a bolt 37. The packing 36 is cylindrical and a female screw hole 36a is recessed upward from the bottom end surface of the packing 36. The packing 36 is somewhat larger in diameter than the large hole 5c. After the packing 36 is pushed into the large hole 5c, the bolt 37 is screwed into the female screw hole 36a, whereby a lower portion of the packing 36 is widened and its outer circumferential surface is brought into close contact with the inner circumferential surface of the large hole 5c.

Figure 21:
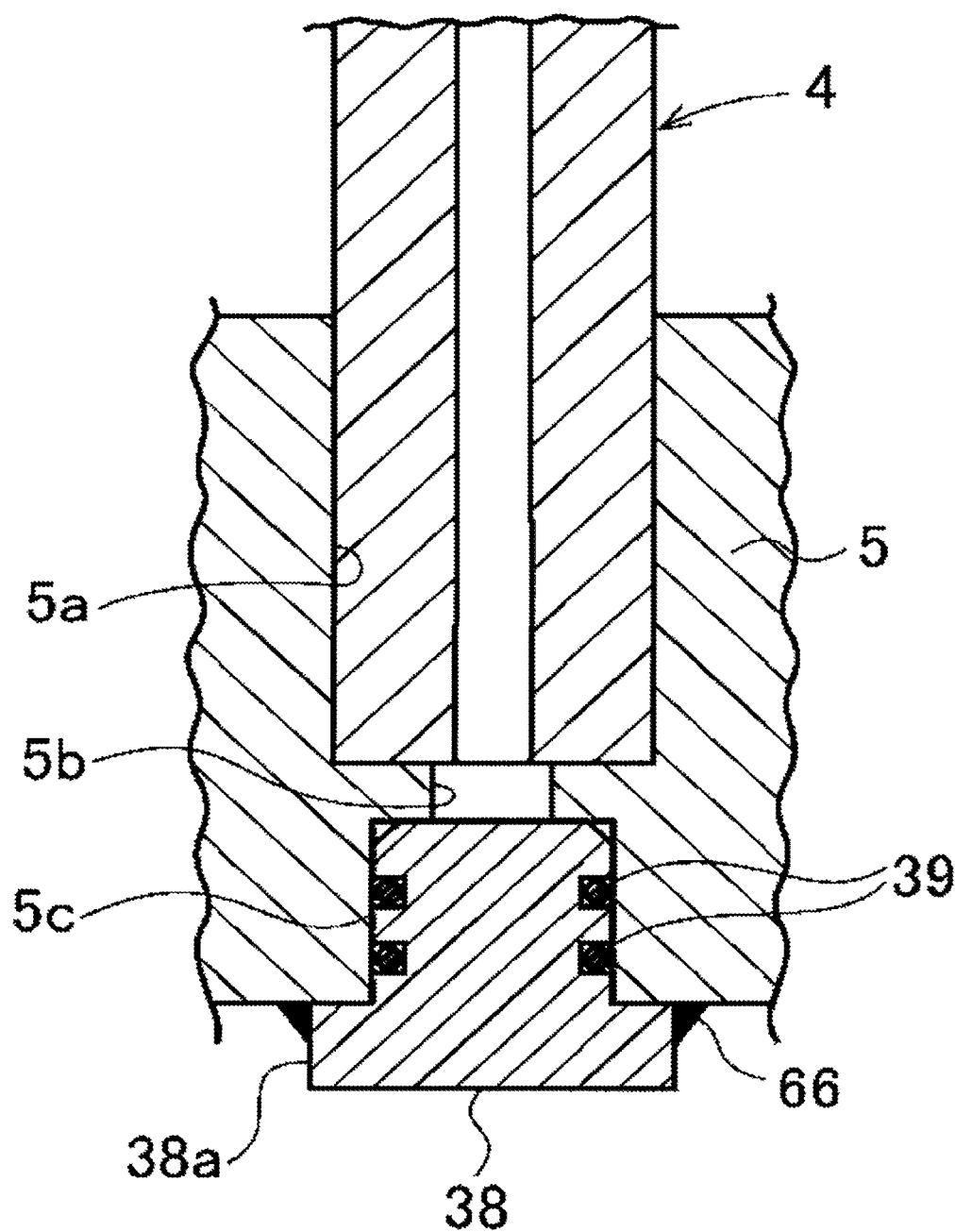
FIG. 21 is another sectional view showing how the separation membrane module according to the fourth embodiment is closed by a closing member.

The closing member shown in FIG. 21 is composed of a plug 38 and O-rings 39. The outer circumferential surface of the plug 38 is formed with circumferential grooves in which the O-rings 39 are inserted. The plug 38 with the O-rings 39 is inserted into the large hole 5c, whereby the O-rings 39 are brought into close contact with the inner circumferential surface of the large hole 5c. A flange 38a of the plug 38 is fixed to the bottom surface of the support plate 5 by fastening means 66 such as welding, brazing, or the like. Alternatively, the plug 38 may be screwed into the large hole 5c instead of being inserted or sealed with a sealing tape instead of being subjected to welding or brazing.

Separation membrane modules according to the invention can be used being connected to each other according to the fluid flow amount or the intended degree of separation or condensation. Where a fluid flow amount or an intended degree of separation or condensation of a processing target fluid is so high that it cannot be processed sufficiently by a single module, it is preferable to make piping so that a fluid which is output from the outlet of one module is supplied to the inlet of another module. Even more modules can be connected to each other according to, that is, to attain, an intended degree of separation or condensation.

A system may be constructed in which separation membrane modules according to the invention are installed parallel with each other and a fluid is caused to branch off and resulting gases are supplied to them. Furthermore, modules can be connected in series to the respective modules which are connected to each other in parallel. In this case, since the supply gas rate decreases in the series connection direction and the linear velocity lowers accordingly, it is preferable to decrease the number of modules arranged in parallel to maintain a necessary linear velocity.

Where modules are arranged in series, permeation components may be either ejected module by module or ejected together by connecting the modules together.

Figure 22:
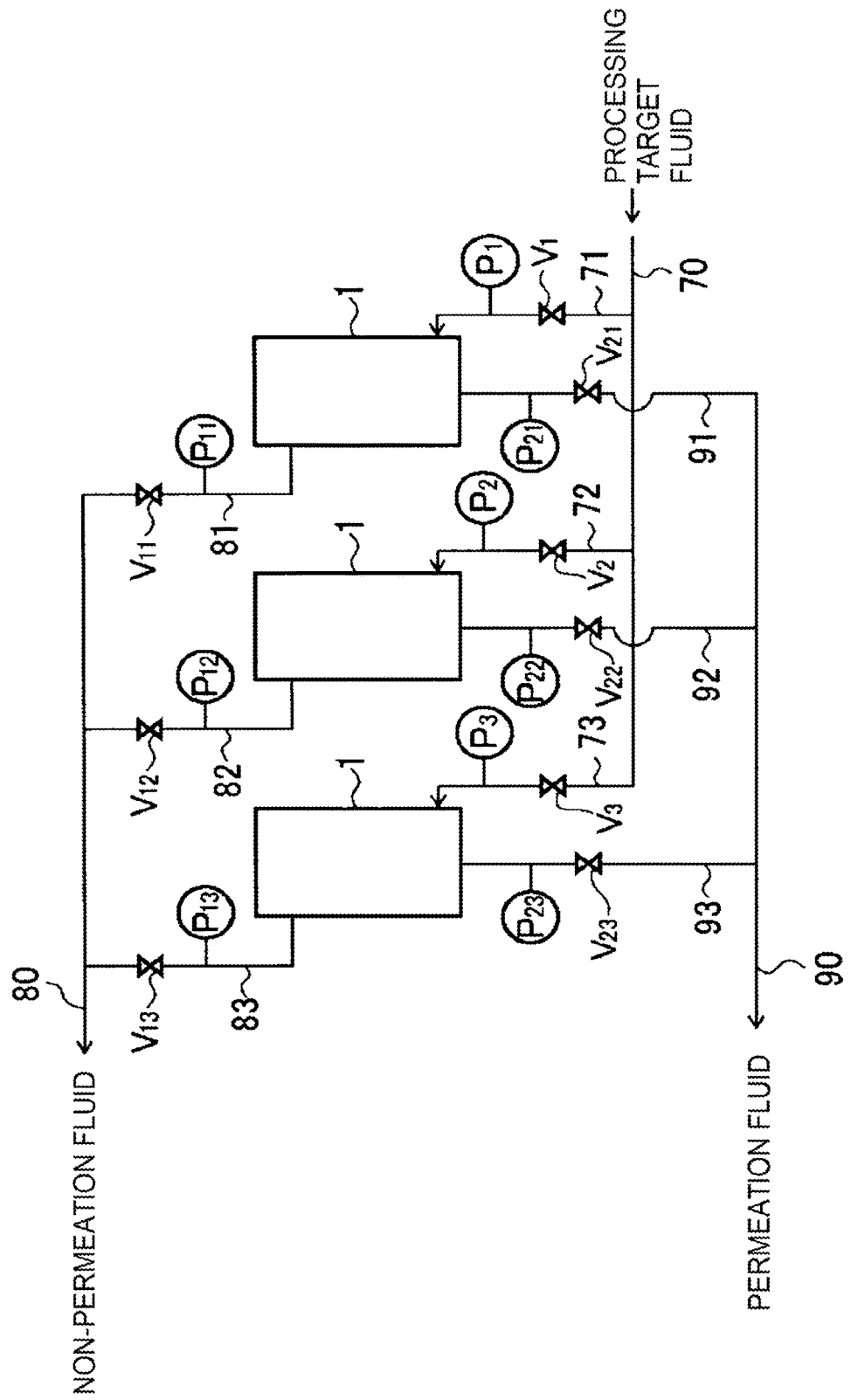
FIG. 22 is a flow diagram of a separation membrane system formed by separation membrane modules according to the fourth embodiment.

FIG. 22 is a flow diagram of a membrane separation system in which plural separation membrane modules 1 are arranged parallel with each other. A processing target fluid is supplied to the inlets 9 of the separation membrane modules 1 via a pipe 70 and branch pipes 71, 72, and 73, respectively, and non-permeation fluids flow out through the outlets 10 and are output via respective pipes 81, 82, and 83 and a collecting pipe 80. Permeation fluids which have permeated the tubular separation membranes 3 of the separation membrane modules 1 flow out through the outlets 6a and are taken out via pipes 91, 92, and 93 and a collecting pipe 90, respectively.

The branch pipes 71, 72, and 73 for supplying a processing target fluid are provided with valves $V_1$, $V_2$, and $V_3$ and pressure sensors $P_1$, $P_2$, and $P_3$, respectively. The pipes 81, 82, and 83 are provided with valves $V_{11}$, $V_{12}$, and $V_{13}$ and pressure sensors $P_{11}$, $P_{12}$, and $P_{13}$, respectively. The permeation fluid pipes 91, 92, and 93 are provided with valves $V_{21}$, $V_{22}$, and $V_{23}$ and pressure sensors $P_{21}$, $P_{22}$, and $P_{23}$, respectively.

During a steady-state operation, all of the valves $V_1$-$V_3$, $V_{11}$-$V_{13}$, and $V_{21}$-$V_{23}$ are kept open. In starting an operation, it is preferable to increase the apertures of the valves $V_1$-$V_3$ gradually to increase, gradually, the pressure of supply of a porous support body supplied to the separation membrane modules 1.

If a part of the tubular separation membranes 3 of one separation membrane module 1, for example, the leftmost separation membrane module 1 in FIG. 22, is damaged, the pressure detected by the pressure sensor $P_{23}$ for flow out piping of permeation fluids in separation membrane module 1 increases and hence the damaging of this tubular separation membrane is detected. In response, the valves $V_3$, $V_{13}$, and $V_{23}$ are closed, the bottom cover 6A of this tubular separation membrane 3 is detached from the housing 2, and the large hole 5c corresponding to the damaged tubular separation membrane 3 is closed by a closing member. In this case, after closing the valves $V_3$, $V_{13}$, and $V_{23}$, the gas existing in this separation membrane module 1 may be replaced by an inert gas or air, if necessary.

Which tubular separation membrane 3 has been damaged can be judged by opening the valve $V_1$, $V_2$, or $V_3$ (the valve $V_3$ is opened in the case of the leftmost separation membrane module 1) at a small aperture and supplying a processing target fluid to inside the housing 2. Alternatively, another gas (pressurized gas) is supplied to the separation membrane module 1 and soap liquid is applied to the bottom surface of the support plate 5. Which tubular separation membrane 3 has been damaged can be judged from a manner of bursting of a soap liquid film. Which tubular separation membrane 3 has been damaged may be judged using smoke from a smoke-generating substance such as incense sticks instead of using a soap liquid film. As a further alternative, which tubular separation membrane 3 has been damaged may be judged roughly from a sound which is generated when a gas flows out through each large hole 5c.

After closing, with a closing member, the large hole 5c which communicates with the damaged tubular separation membrane 3, the bottom cover 6A is attached again and a steady-state operation is recovered.

As described above, even if one (or some) of the tubular separation membrane 3 is damaged, a steady-state operation is recovered in a short time by closing, with a closing member, the large hole 5c which communicates with the damaged tubular separation membrane 3. Where plural separation membrane modules 1 are arranged parallel with each other as shown in FIG. 22, it is possible to stop operation of only a damaged separation membrane module(s) 1 and cause the other separation membrane modules 1 to continue steady-state operations.

Although in the above description a damage of tubular separation membrane is detected on the basis of pressures detected by the pressure sensors $P_{21}$, $P_{22}$, and $P_{23}$, a damaged tubular separation membrane 3 may be detected on the basis of membrane permeation difference pressures $P_1$-$P_{21}$, $P_2$-$P_{22}$, and $P_3$-$P_{23}$. As a further alternative, the pipes 91-93 may be provided with respective gas sensors for detecting a particular component methane, hydrogen, carbon dioxide, or the like instead of or in addition to the respective pressure sensors so that a damaged tubular separation membrane 3 is detected on the basis of variations of the densities of the particular component.

Although the separation membrane module according to the invention has been described using the first to fourth embodiments as specific examples, the invention also relates to a gas mixture separation method of introducing the gas mixture into the separation membrane module and separating a highly permeable gas from the mixture through permeation of the former and a method for manufacturing a high-density gas by introducing a gas mixture into the separation membrane module and producing a high-density gas by separating a highly permeable gas.

EXAMPLES

Next, a specific mode of the invention will be described in further detail by using Examples. However, the invention is not limited to these Examples.

To confirm the vibration preventing effect, simulations were performed to compare a case that the top portion was fixed by using a spring and a case that the top portion was free.

(Assumptions about Calculations)

Figure 23A:
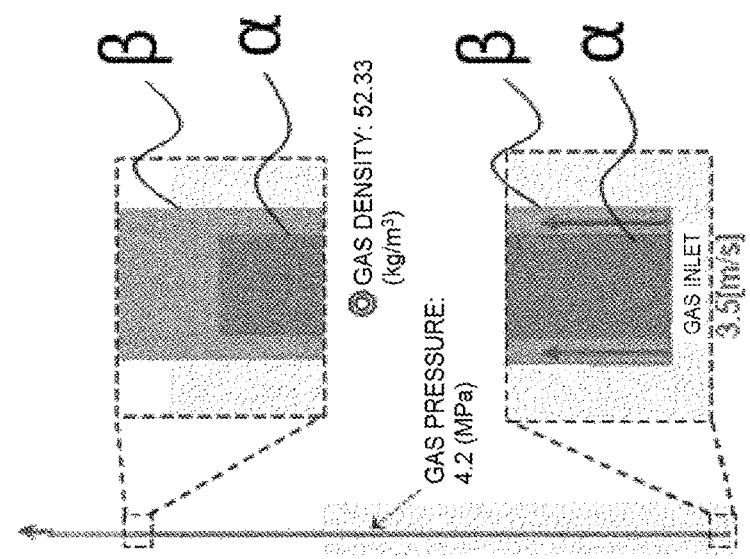
FIG. 23(A) is a schematic diagram of a system which was used for simulations of Examples.

As shown in FIG. 23(a) which is a schematic diagram, a porous alumina pipe α which is sealed on both ends and is 12 mm in outer diameter; 9 mm in inner diameter; and 1,000 mm in length is set at the center in a pipe β which is 18 mm in inner diameter and 1,310 mm in length is set vertically. A gas of a pressure 4.2 MPa and a density 52.3 kg/m³ is caused to flow through the pipe β from one side from the bottom part at a gas linear velocity 3.5 m/s. A manner of gas flow is calculated and it is examined whether the alumina pipe α is deformed (curved) by a left/right pressure difference which is produced in the alumina pipe cc by the gas flow.

Referential Example 1

Figure 23B:
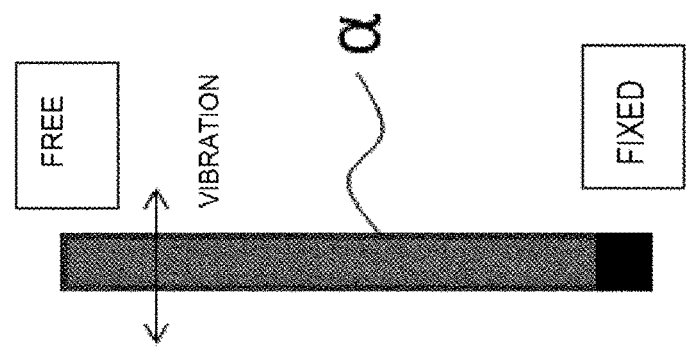
FIG. 23(B) shows a simplified image of an alumina pipe of Referential Example 1.

As shown in FIG. 23(b), a gas is caused to flow in a state that the bottom end of the alumina pipe α is fixed and its top end is set free.

Referential Example 2

Figure 23C:
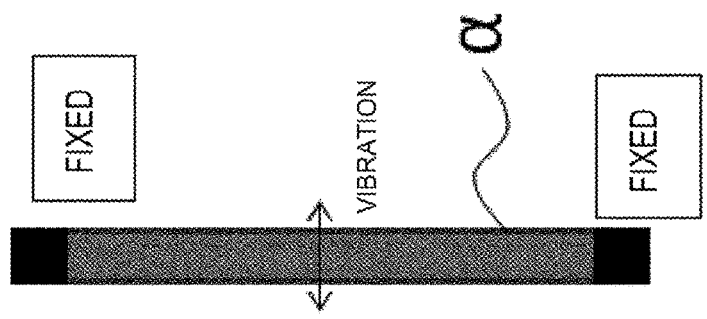
FIG. 23(C) shows a simplified image of an alumina pipe of Referential Example 2.

As shown in FIG. 23(c), a gas is caused to flow in a state that both end of the alumina pipe α are fixed.

Results are shown in Table 1. With the same manner of gas flow, it was found that vibration of the alumina pipe can be suppressed to a large extent by fixing not only the bottom end of the alumina pipe but also its top end.

TABLE 1

| | Fixing position(s) of alumina pipe | Deformation (μm) |
|---|---|---|
| Referential Example 1 | Only bottom end | 26.8 |
| Referential Example 2 | Top end and bottom end | 1.9 |

Although the invention has been described in detail by referring to the particular embodiments, it is apparent to those skilled in the art that various changes and modifications are possible without departing from the spirit and scope of the invention. The present application is based on Japanese Patent Application No. 2015-35383 filed on Feb. 25, 2015, No. 2015-35384 filed on Feb. 25, 2015, No. 2015-35385 filed on Feb. 25, 2015, No. 2015-35386 filed on Feb. 25, 2015, and No. 2015-250116 filed on Dec. 22, 2015, the disclosures of which are incorporated herein by reference.

DESCRIPTION OF SYMBOLS

1: Separation membrane module
2: Housing
3: Tubular separation membrane
4: End pipe
5: Support plate
5a: Insertion hole
5c: Large hole
6A: Bottom cover
6B: Top cover
6a: Outlet
7, 8: Baffle
7a, 8a: Insertion through-hole
9: Inlet
10: Outlet
11, 12: Room
13: Main room
14: Rod
16: Outflow room
17: Joint pipe
20: End plug
25: Pressing plate
25a: Opening
26: Spring
28, 61: Vibration absorbing sheet
30-35, 39: O-ring
36, 63: Packing
40: Vibration absorbing body
41: Wire
62: Closing member
α: Alumina pipe
β: Pipe

The invention claimed is:

1. A separation membrane module comprising:
a cylinder-shaped housing; and
a tubular separation membrane disposed in the housing, wherein:
a processing target fluid flows through the housing from its one end side to the other end side and a fluid which has permeated the tubular separation membrane flows through the tubular separation membrane and is taken out;
an end pipe is connected to one end portion of the tubular separation membrane;
the end pipe is supported by a support plate which is disposed so as to traverse the housing;
an end plug is connected to the other end portion of the tubular separation membrane; and
the separation membrane module further comprises a coming-out preventive member which prevents the end plug from coming out of the tubular separation membrane, wherein the separation membrane module further comprises, as the coming-out preventive member, a spring which pulls the end plug and the end pipe toward itself.

2. The separation membrane module according to claim 1, wherein the spring which presses the end plug toward the tubular separation membrane is sandwiched between the pressing plate and the end plug.

3. The separation membrane module according to claim 1, wherein the end plug has a rod which projects from a top end surface of the end plug.

4. The separation membrane module according to claim 1, wherein:
the housing is provided with an opening and closing member which can be opened and closed; and
a closing member can be attached to a permeation fluid output portion of the tubular separation membrane via the opening and closing member.

5. A method for repairing the separation membrane module according to claim 4, comprising the steps of:
opening the opening and closing member of the housing when the separation membrane module has been damaged; and
attaching the closing member to the permeation fluid output portion of the damaged tubular separation membrane.

6. The separation membrane module according to claim 1, wherein the fluid is a gas mixture.

7. A separation membrane module comprising:
a cylinder-shaped housing; and
a tubular separation membrane disposed in the housing, wherein:
a processing target fluid flows through the housing from its one end side to the other end side and a fluid which has permeated the tubular separation membrane flows through the tubular separation membrane and is taken out;
an end pipe is connected to one end portion of the tubular separation membrane;
the end pipe is supported by a support plate which is disposed so as to traverse the housing;
an end plug is connected to the other end portion of the tubular separation membrane; and
the end plug has an urging member, wherein the urging member is at least one of a pressing plate which is opposed to the end plug and a spring which presses the end plug toward the tubular separation membrane or a spring which pulls the end plug and the end pipe toward itself.

8. A separation membrane module comprising:
a cylinder-shaped housing;
a tubular separation membrane disposed in the housing;
a vibration absorbing member for the tubular separation membrane, wherein:
a processing target fluid flows through the housing from its one end side to the other end side and a fluid which has permeated the tubular separation membrane flows through the tubular separation membrane and is taken out, wherein:
an end pipe is connected to one end portion of the tubular separation membrane;
the end pipe is supported by a support plate which is disposed so as to traverse the housing;
an end plug is connected to the other end portion of the tubular separation membrane; and
the vibration absorbing member is disposed so as to be in contact with the end plug; and
a pressing plate which is opposed; to the end plug, wherein:
the end plug or a rod which projects from the end plug is inserted through an opening of the pressing plate; and
the vibration absorbing member is disposed on the opposite side of the pressing plate to the tubular separation membrane, and the end plug or the rod is in contact with the vibration absorbing member.

9. The separation membrane module according to claim 8, wherein the vibration absorbing member is a sheet-like member.

10. A separation membrane module comprising:
a cylinder-shaped housing; and
a tubular separation membrane disposed in the housing, wherein:
a processing target fluid flows through the housing from its one end side to the other end side and a fluid which has permeated the tubular separation membrane flows through the tubular separation membrane and is taken out;
an end pipe is connected to one end portion of the tubular separation membrane;
the end pipe is supported by a support plate which is disposed so as to traverse the housing;
an end plug is connected to the other end portion of the tubular separation membrane; and
the separation membrane module further comprises a coming-out preventive member which prevents the end plug from coming out of the tubular separation membrane,
wherein:
the end pipe projects from one plate surface of a support plate which is disposed so as to traverse the housing;
the end pipe is inserted in an insertion hole which is formed in the one plate surface of the support plate; and
sealing is established between the end pipe and the insertion hole by an O-ring, wherein the O-ring is inserted in a groove which is formed in at least one of an outer circumferential surface and an end surface of the end pipe; and
the end pipe and the support plate are connected to each other by insertion, in the insertion hole, of the end pipe to which the O-ring is attached.

* * * * *